United States Patent
Sharma et al.

(10) Patent No.: US 11,647,264 B2
(45) Date of Patent: May 9, 2023

(54) CAMERA WITH BUMPER FOR CUSHIONING LATERAL MOVEMENT

(71) Applicant: Apple Inc., Cupertino, CA (US)

(72) Inventors: Shashank Sharma, San Francisco, CA (US); Alfred N. Mireault, San Francisco, CA (US); Nicholas D. Smyth, San Jose, CA (US); Zachary W. Birnbaum, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/664,543

(22) Filed: May 23, 2022

(65) Prior Publication Data

US 2022/0286584 A1    Sep. 8, 2022

Related U.S. Application Data

(63) Continuation of application No. 16/984,334, filed on Aug. 4, 2020, now Pat. No. 11,350,018.

(Continued)

(51) Int. Cl.
*H04N 5/225* (2006.01)
*H04N 5/232* (2006.01)
(Continued)

(52) U.S. Cl.
CPC ............. *H04N 5/2251* (2013.01); *G02B 7/09* (2013.01); *G02B 27/646* (2013.01); *G03B 5/02* (2013.01);
(Continued)

(58) Field of Classification Search
CPC ............. H04N 5/2251; H04N 5/23212; H04N 5/23287; H04N 5/2257; H04N 5/2254;
(Continued)

(56) References Cited

U.S. PATENT DOCUMENTS 7,271,511 B2    9/2007   Osaka
7,787,046 B2    8/2010   Nagasaki
(Continued)

FOREIGN PATENT DOCUMENTS

CN         1873513       12/2006
CN       103246125       8/2013
(Continued)

OTHER PUBLICATIONS

Office Action from Chinese Application No. 2020107838710, dated Aug. 25, 2021, pp. 1-17.
(Continued)

*Primary Examiner* — Usman A Khan
(74) *Attorney, Agent, or Firm* — Robert C. Kowert; Kowert, Hood, Munyon, Rankin & Goetzel, P.C.

(57) ABSTRACT

Various embodiments include a camera having one or more bumper arrangements to cushion lateral movement of one or more camera components. In some embodiments, the bumper arrangement(s) may cushion lateral movement of a moveable platform as the moveable platform approaches a stationary structure. According to some embodiments, the bumper arrangement(s) may include one or more bumper features attached to (and/or defined by) the moveable platform and/or the stationary structure.

20 Claims, 14 Drawing Sheets

Related U.S. Application Data

(60) Provisional application No. 62/883,548, filed on Aug. 6, 2019.

(51) Int. Cl.

| | | |
|---|---|---|
| *H04N 5/228* | (2006.01) | |
| *G02B 7/09* | (2021.01) | |
| *G02B 27/64* | (2006.01) | |
| *G03B 5/02* | (2021.01) | |
| *G03B 13/36* | (2021.01) | |

(52) U.S. Cl.
CPC ......... *G03B 13/36* (2013.01); *H04N 5/23212* (2013.01); *H04N 5/23287* (2013.01); *G03B 2205/0007* (2013.01); *G03B 2205/0084* (2013.01)

(58) Field of Classification Search
CPC .......... G02B 7/09; G02B 27/646; G03B 5/02; G03B 13/36; G03B 2205/0007; G03B 2205/0084; G03B 2205/0015; G03B 30/00; F16F 15/073
USPC .................................................... 348/208.11
See application file for complete search history.

(56) References Cited

U.S. PATENT DOCUMENTS

| | | | |
|---|---|---|---|
| 8,611,735 | B2 | 12/2013 | Sekimoto |
| 9,049,366 | B2 | 6/2015 | Zhang et al. |
| 9,554,023 | B2 | 1/2017 | Park |
| 10,018,800 | B2 | 7/2018 | Cheng |
| 10,317,649 | B2 | 6/2019 | Sharma et al. |
| 11,350,018 | B2 | 5/2022 | Sharma et al. |
| 2004/0174614 | A1* | 9/2004 | Hovanky ................. G03B 3/10 359/694 |
| 2007/0257989 | A1 | 11/2007 | Shirono |
| 2007/0279497 | A1 | 12/2007 | Wada et al. |
| 2008/0031605 | A1 | 2/2008 | Akada et al. |
| 2008/0129830 | A1 | 6/2008 | Inoue et al. |
| 2010/0079604 | A1 | 4/2010 | Washisu |
| 2011/0279916 | A1 | 11/2011 | Brown et al. |
| 2012/0075519 | A1 | 3/2012 | Blasch |
| 2013/0142502 | A1 | 6/2013 | Kang et al. |
| 2013/0163974 | A1 | 6/2013 | Takei |
| 2014/0043496 | A1 | 2/2014 | Azuma |
| 2015/0296143 | A1 | 10/2015 | Kang et al. |
| 2015/0350499 | A1 | 12/2015 | Topliss |
| 2017/0150022 | A1 | 5/2017 | Shigemitsu |
| 2017/0153409 | A1 | 6/2017 | Chan |
| 2018/0348469 | A1 | 12/2018 | Son et al. |

FOREIGN PATENT DOCUMENTS

| | | |
|---|---|---|
| CN | 204422843 | 6/2015 |
| CN | 104836941 | 8/2015 |
| CN | 104902149 | 9/2015 |
| CN | 105301871 | 2/2016 |
| CN | 105739051 | 7/2016 |
| CN | 105899990 | 8/2016 |
| CN | 206411316 | 8/2017 |
| CN | 207573455 | 7/2018 |
| WO | 2013027927 | 2/2013 |

OTHER PUBLICATIONS

U.S. Appl. No. 16/714,380, filed Dec. 13, 209, Scott W. Miller.
Unknown, "Mini Photo Pro Lens Kit", Retrieved from https://www.restorationhardware.com/catalog/product/product.jsp?productId=prod4640185 on Dec. 18, 2019, pp. 1-2.

* cited by examiner

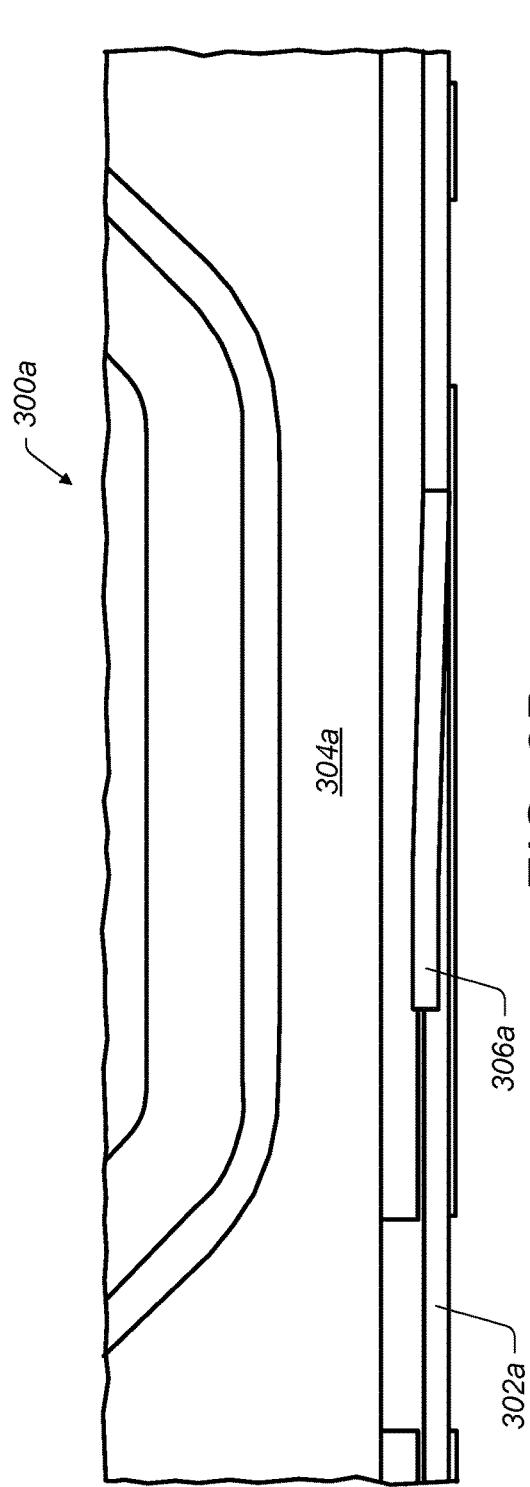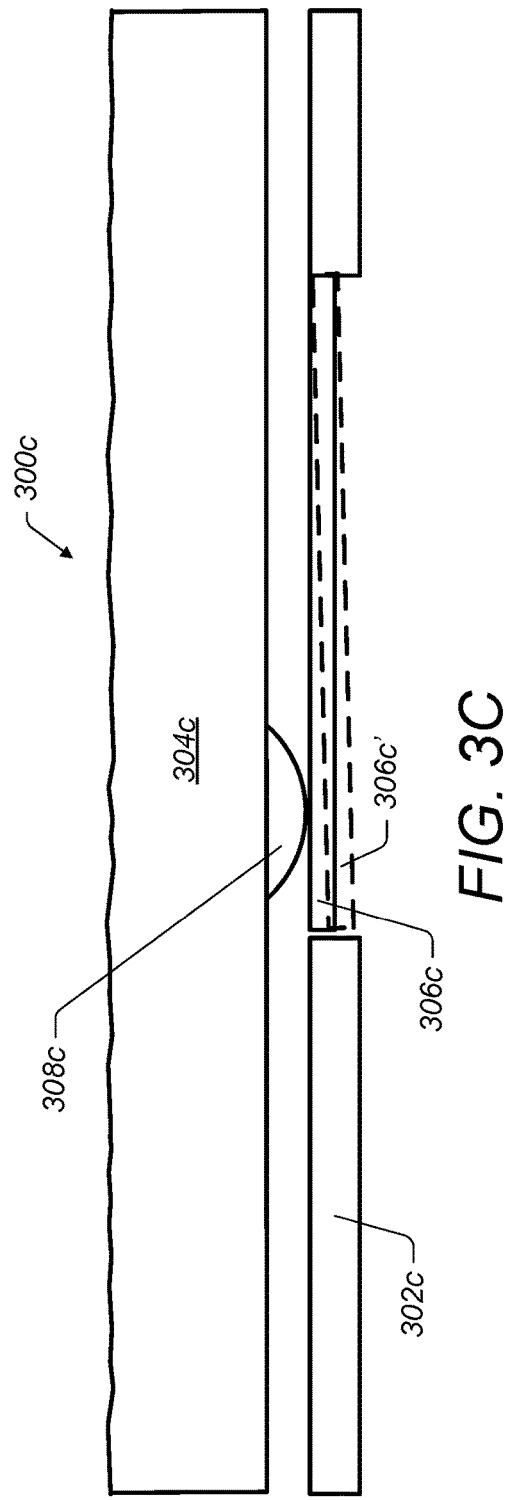

CAMERA WITH BUMPER FOR CUSHIONING LATERAL MOVEMENT

This application is a continuation of U.S. patent application Ser. No. 16/984,334, filed Aug. 4, 2020, which claims benefit of priority to U.S. Provisional Application No. 62/883,548, filed Aug. 6, 2019, titled "Camera with Bumper for Cushioning Lateral Movement", which are hereby incorporated by reference in their entirety.

BACKGROUND

Technical Field

This disclosure relates generally to architecture for a camera having one or more bumpers to cushion lateral movement of a moveable platform as it approaches a stationary structure.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 1A shows a perspective view of the camera and a detail view of component(s) of the bumper arrangement. FIG. 1B shows a perspective view of component(s) of the bumper arrangement. FIG. 1C shows a cross-sectional view of the camera. FIG. 1D shows a detail view of a portion of the camera, as indicated by detail circle 1D shown in FIG. 1C. FIG. 1E shows another cross-sectional view of the camera. FIG. 1F shows a detail view of a portion of the camera, as indicated by detail circle 1F shown in FIG. 1E. FIG. 1G shows another perspective view and detail views of the bumper arrangement.

FIG. 2A shows a side view of the bumper arrangement. FIG. 2B shows a cross-sectional view of the bumper arrangement. FIG. 2C shows another cross-sectional view of the bumper arrangement.

FIGS. 3A-3C illustrate views of yet another example bumper arrangement for cushioning lateral movement of a moveable platform of a camera, in accordance with some embodiments. FIG. 3A shows a perspective view of the bumper arrangement. FIG. 3B shows a top view of the bumper arrangement. FIG. 3C shows a top view of an example alternative embodiment of the bumper arrangement.

Figure 1A:
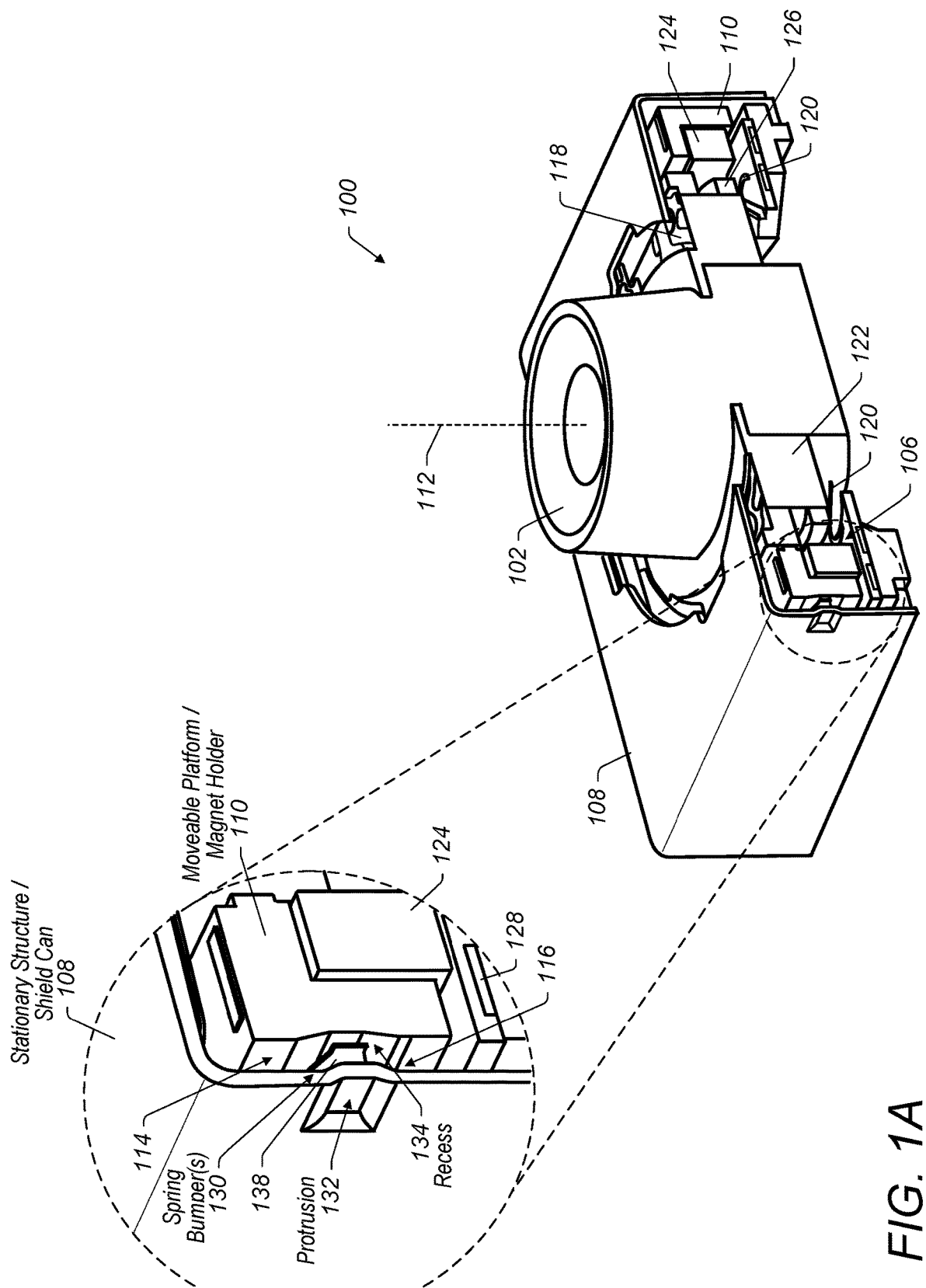
FIGS. 1A-1G illustrate views of an example camera having an example bumper arrangement for cushioning lateral movement of a moveable platform of the camera, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with one or more bumper features that may be used to cushion lateral movement of a moveable platform of the camera. In some examples, the bumper(s) may be used to cushion lateral movement of the moveable platform before the moveable platform reaches a lateral end stop defined by a stationary structure of the camera. Additionally, or alternatively, the bumper(s) may cushion lateral movement of the moveable platform as the moveable platform approaches the stationary structure. The bumper(s) may prevent an undesirable collision between the moveable platform and the stationary structure (e.g., as a result of a drop event) that may damage the camera, negatively impact camera performance, and/or negatively impact user experience. In some instances, an undesirable "clicking" sound may be produced if the moveable platform collides with the stationary structure. The bumper(s) may provide acoustic mitigation to prevent or lessen such unwanted acoustics. Furthermore, in some examples, the bumper(s) may be used to reduce or limit an amount of electrostatic charge accumulation on the moveable platform and/or the stationary structure.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
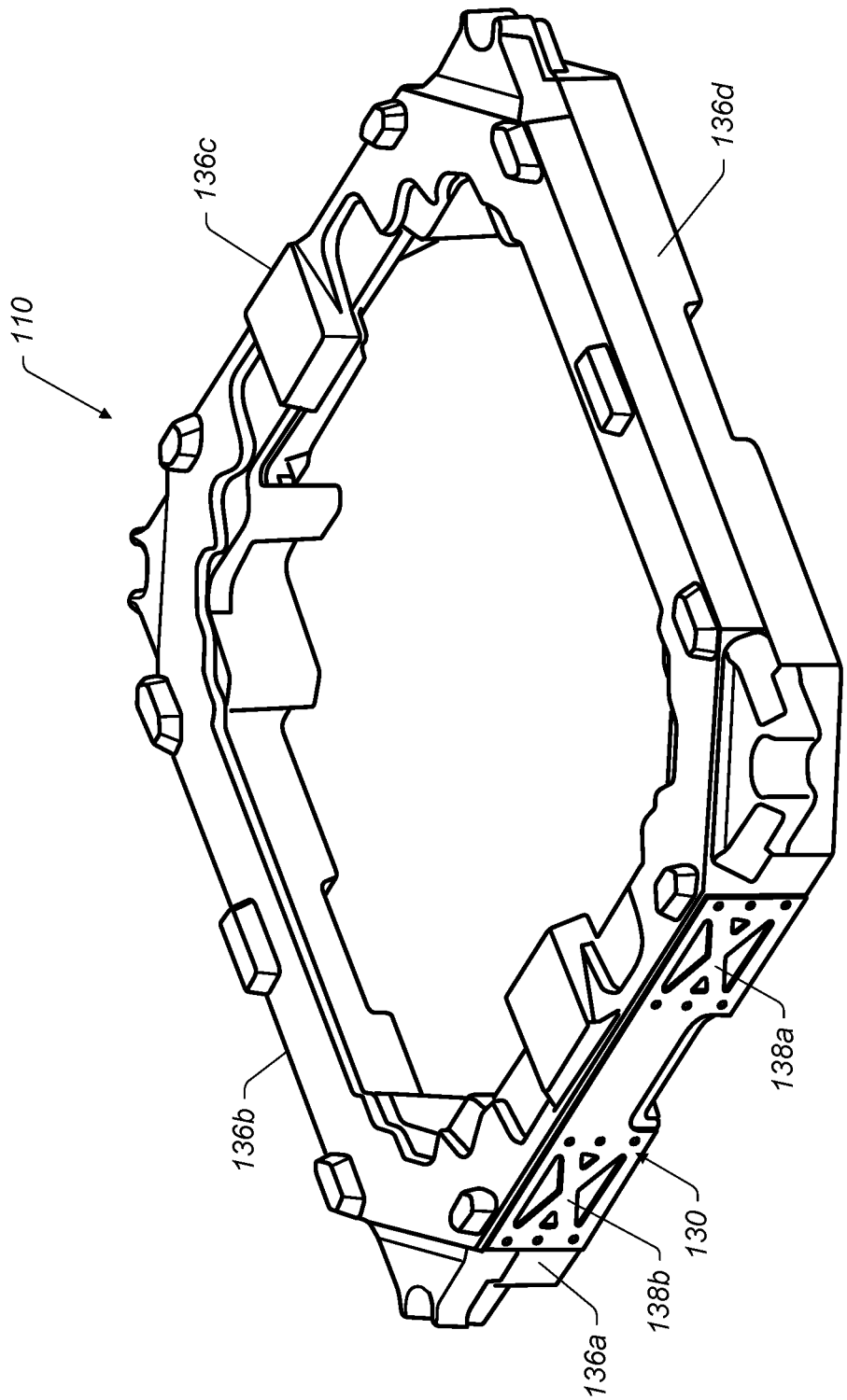
Figure 1C:
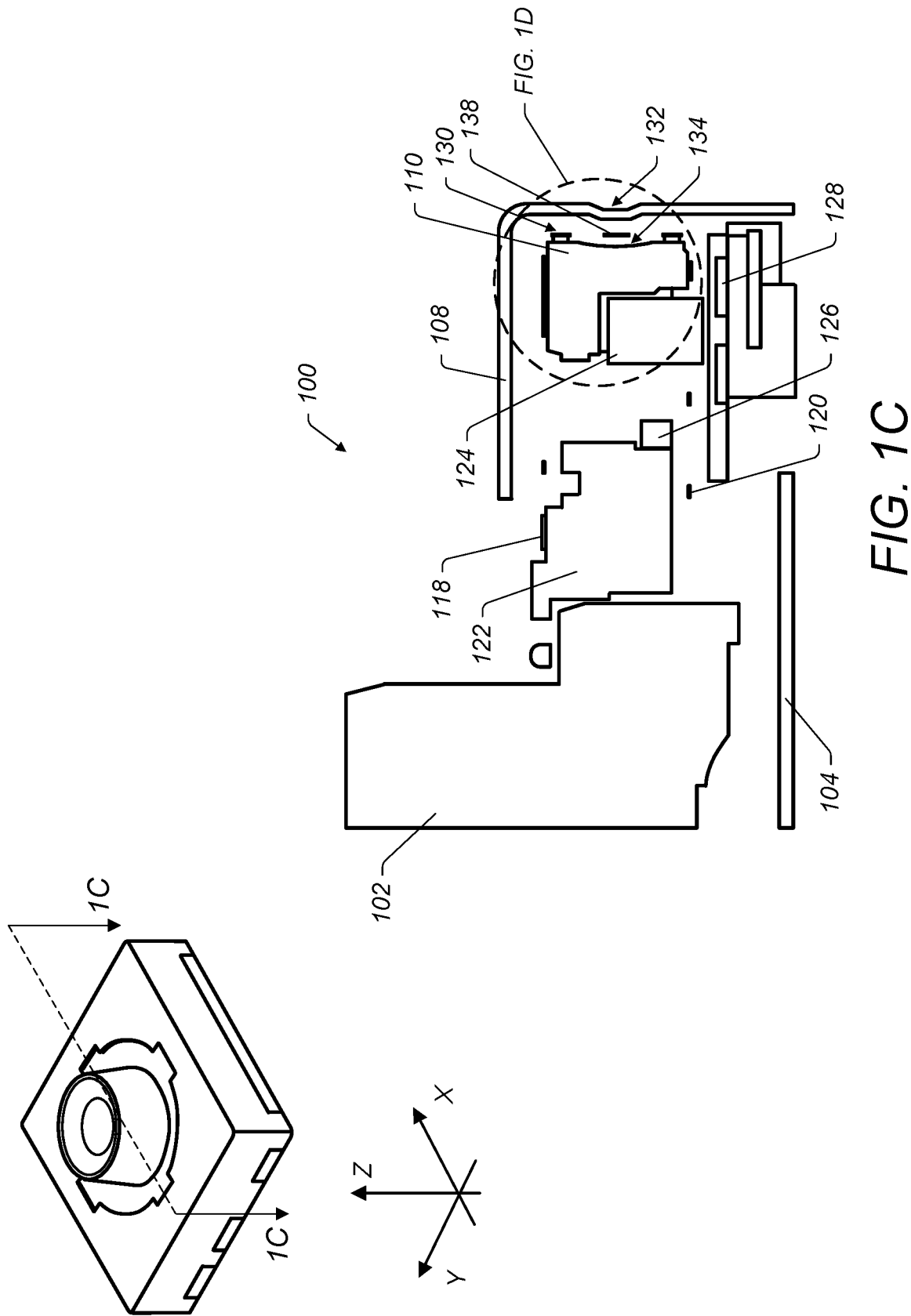
Figure 1D:
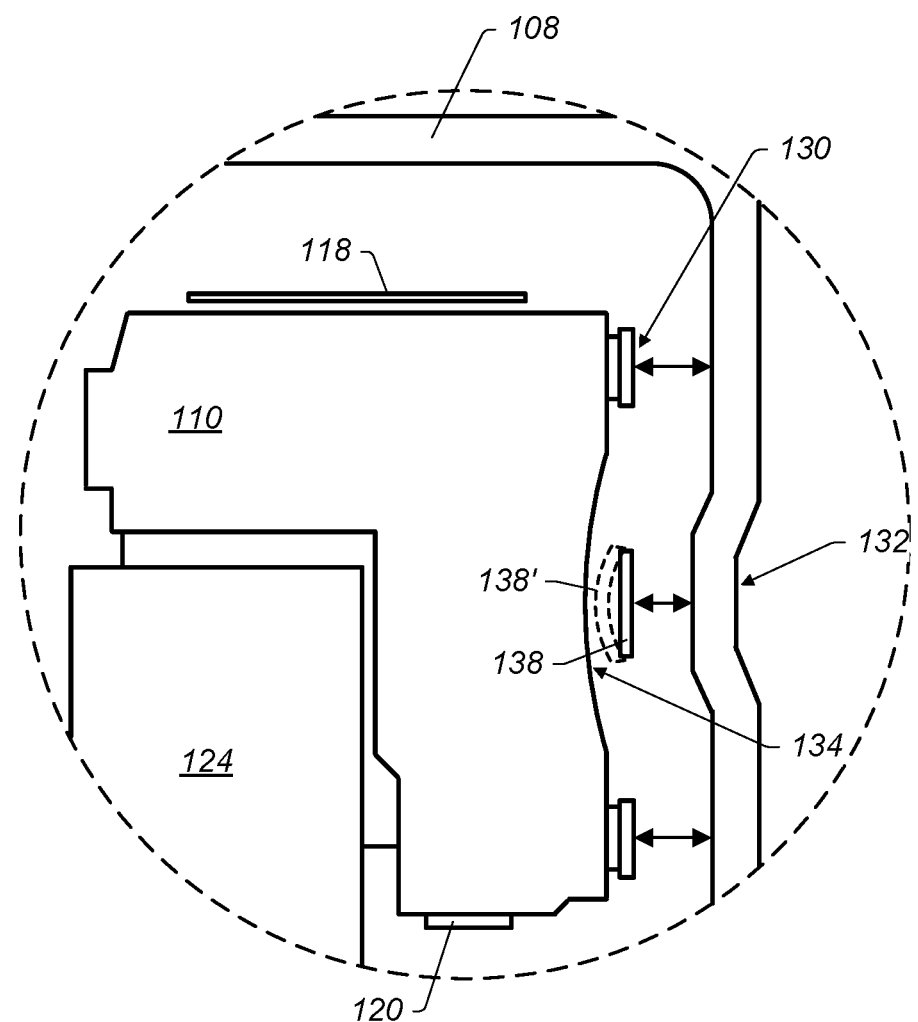
Figure 1E:
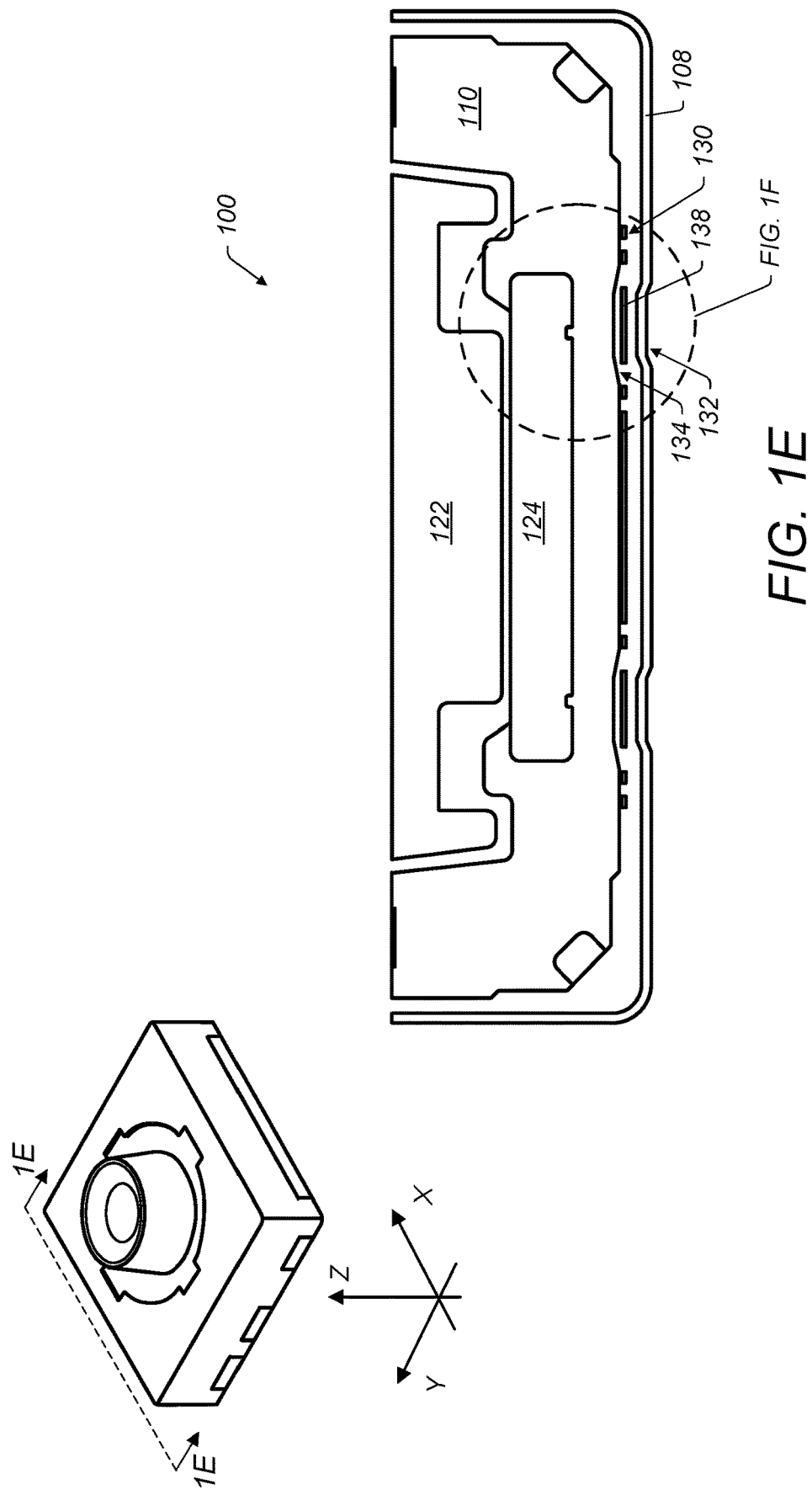
Figure 1F:
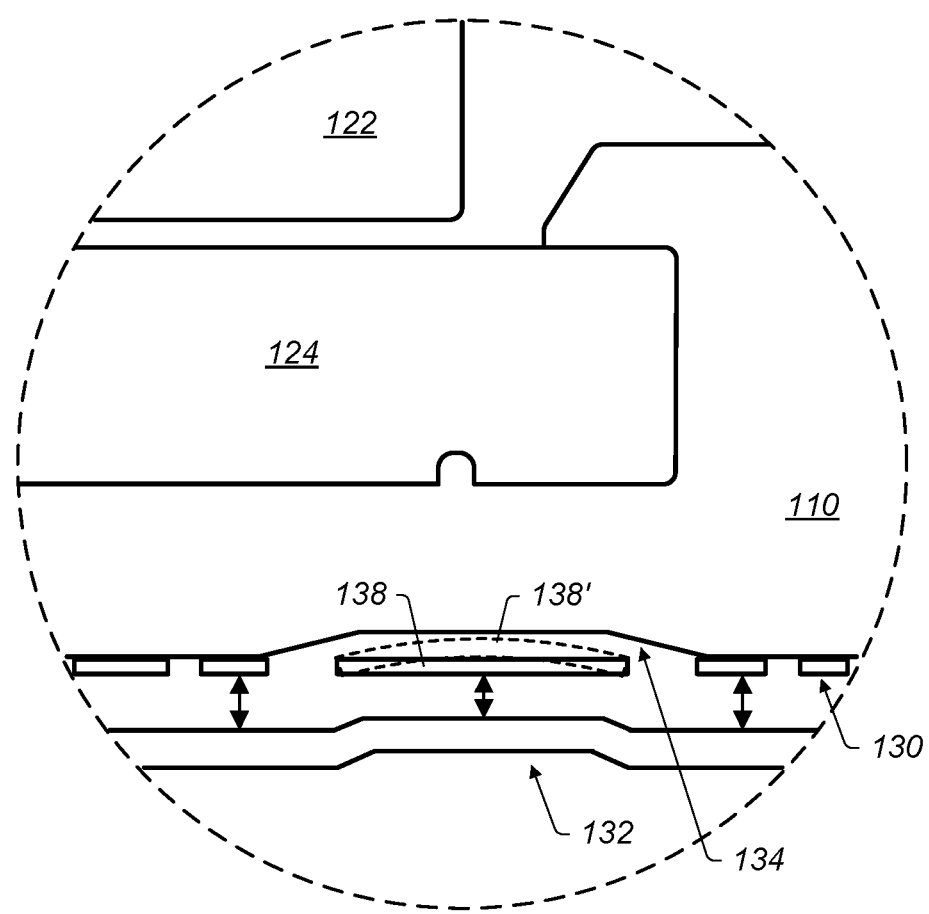
Figure 1G:
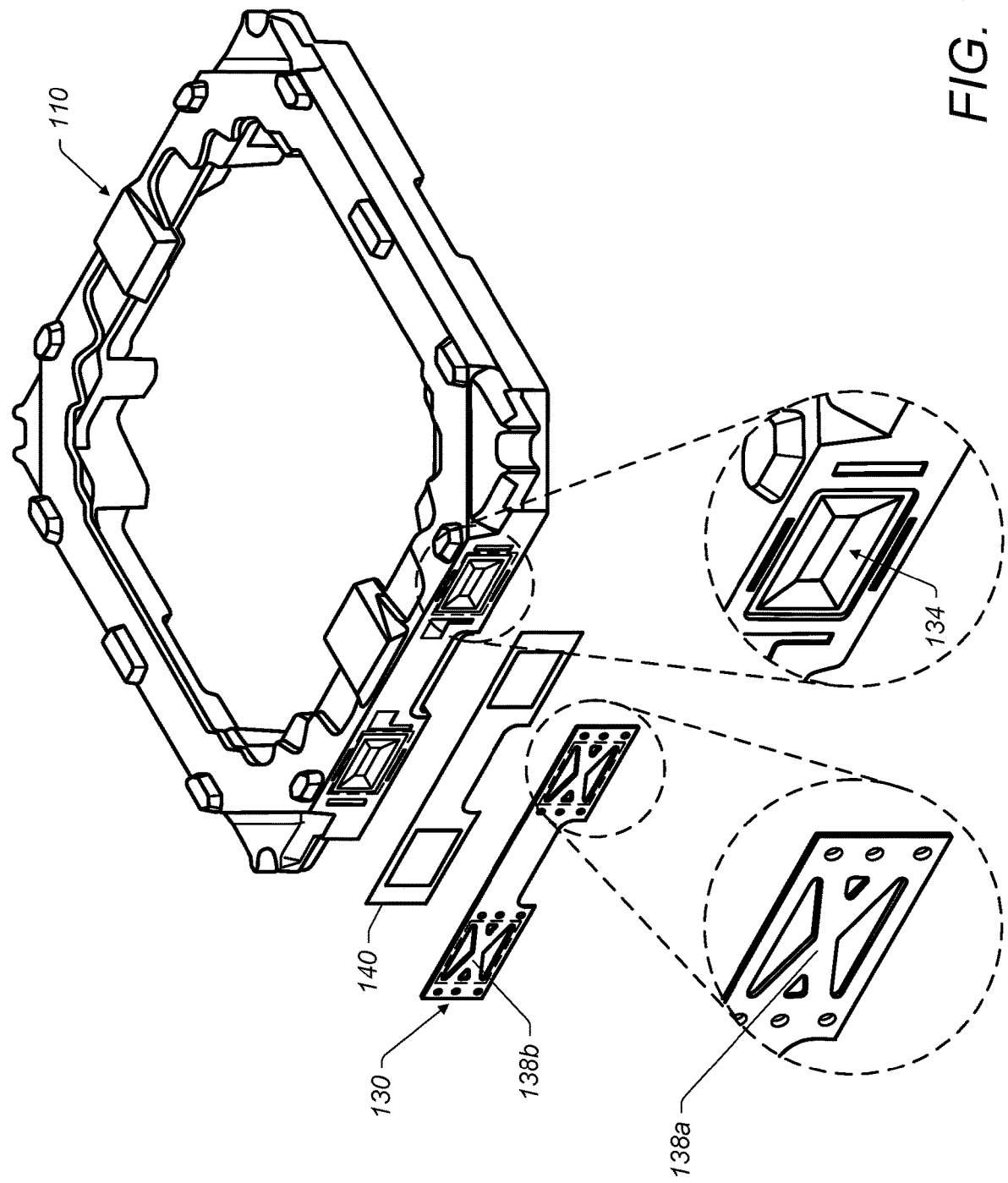

FIGS. 1A-1G illustrate views of an example camera 100 having an example bumper arrangement for cushioning lateral movement of a moveable platform of the camera. FIG. 1A shows a perspective view of the camera 100 and a detail view of component(s) of the bumper arrangement. FIG. 1B shows a perspective view of component(s) of the bumper arrangement. FIG. 1C shows a cross-sectional view of the camera 100. FIG. 1D shows a detail view of a portion of the camera, as indicated by detail circle 1D shown in FIG. 1C. FIG. 1E shows another cross-sectional view of the camera 100. FIG. 1F shows a detail view of a portion of the camera 100, as indicated by detail circle 1F shown in FIG. 1E. FIG. 1G shows another perspective view and detail views of the bumper arrangement.

In some embodiments, the camera 100 may include a lens group 102, an image sensor 104 (see FIG. 1C), an actuator 106, a stationary structure 108, and/or a moveable platform 110. The lens group 102 may include one or more lens elements that define an optical axis 112. The image sensor 104 may capture light that passes through the lens group 102. The actuator 106 may be configured to move the lens group 102 relative to the image sensor 106.

According to various embodiments, the stationary structure 108 may include a shield can that covers at least a portion of the internal component(s) of the camera 100. Furthermore, the moveable platform 110 may include a magnet holder that holds one or more magnets of the actuator 106. In other embodiments, the stationary structure 108 may include one or more components other than the shield can, and the moveable platform 110 may include one or more components other than the magnet holder.

In some embodiments, the moveable platform 110 may be coupled to the lens group 102. For instance, the moveable platform 110 may be coupled to the lens group 102 such that the moveable platform 110 moves together (e.g., in lockstep) with the lens group 102, e.g., when the actuator 106 moves the lens group 102 relative to the image sensor 104. In some examples, the moveable platform 110 may be coupled to the lens group 102 such that the moveable platform 110 and the lens group 102 are moveable together in one or more directions orthogonal to the optical axis 112. In some embodiments, the moveable platform 110 may include an outer surface portion 114. Furthermore, the stationary structure 108 may include an inner surface portion 116. In some examples, the outer surface portion 114 and the inner surface portion 116 may face each other. According to various embodiments, the inner surface portion 116 of the stationary structure 108 may define a lateral end stop with respect to lateral movement of the moveable platform 110, e.g., movement in one or more directions orthogonal to the optical axis 112. The lateral end stop, for example, may stop the moveable platform 110 from moving in a direction orthogonal to the optical axis 112 (e.g., movement resulting from impact in a drop event) beyond the inner surface portion 116 of the stationary structure 108.

In some embodiments, the camera 100 may include a suspension spring structure that couples the moveable platform 110 with the lens group 102. The suspension spring structure may be used to guide movement of the lens group 102 along the optical axis 112 and/or in one or more directions orthogonal to the optical axis 112 in a controlled manner. For example, the suspension spring structure may include a top spring 118 and/or a bottom spring 120. According to some embodiments, the suspension spring structure may couple the moveable platform 110 with a lens carrier 122 that is configured to hold or otherwise support the lens group 102. In some examples, the lens group 102 may be fixedly attached to the lens carrier 122. The suspension arrangement may couple the lens carrier 122 with the moveable platform 110 such that the lens carrier 122 and the moveable platform 110 are moveable together, relative to the image sensor 104, in one or more directions orthogonal to the optical axis 112. Additionally, or alternatively, the suspension arrangement may couple the lens carrier 122 with the moveable platform 110 such that the lens carrier 122 (and the lens 102) are moveable, relative to the moveable platform 110 and/or the image sensor 104, along the optical axis 112. In various embodiments, the stationary structure 108 may be stationary relative to movement of the moveable platform 110 and/or the lens carrier 122.

In some examples, the actuator 106 may be a voice coil motor (VCM) actuator that includes one or more coils and one or more magnets. In some embodiments, the actuator 106 may include magnet(s) 124 and autofocus (AF) coil(s) 126 that are configured to magnetically interact to move the lens group 102 along the optical axis 112, e.g., to provide AF movement of an image captured via the image sensor 104. Additionally, or alternatively, the actuator 106 may include magnet(s) 124 and optical image stabilization (OIS) coils 128, e.g., to provide OIS movement of an image captured via the image sensor 104.

According to various embodiments, the camera 100 may include a bumper arrangement for cushioning lateral movement of the moveable platform 110, e.g., as the moveable platform 110 approaches the stationary structure 108. In some embodiments, the bumper arrangement may include one or more spring bumpers 130, a protrusion 132, and/or a recess 134. The spring bumper 130 may be attached to an outer surface (e.g., the outer surface portion 114) of the moveable platform 110. The protrusion 132 may extend from the stationary structure 108 towards the spring bumper 130. In some embodiments, the protrusion 132 may engage (e.g., make contact with) the spring bumper 130 when a lateral movement stroke of the moveable platform 110 reaches a stroke threshold. The protrusion 132 may be defined by the stationary structure 108 in some embodiments. The recess 134 may be defined by the moveable platform 110. Furthermore, the recess 134 may be formed to receive a deflected portion of the spring bumper 130 when the lateral movement stroke of the moveable platform 110 exceeds the stroke threshold, e.g., as indicated in FIGS. 1D and 1F. For example, the recess 134 may be sized and/or shaped such that it provides a space within which at least a portion of the spring bumper 130 may extend during deflection.

As indicated in FIG. 1B, the spring bumper 130 may be attached to a side of the moveable platform 110. While FIGS. 1A-1G show a spring bumper 130 to one side of the moveable platform 110, the bumper arrangement may include one or more additional spring bumpers 130 (and/or one or more other corresponding bumper arrangement components, such as protrusion(s) 132 and/or the recess(es) 134) attached to one or more additional sides of the moveable platform 110. For example, the moveable platform 110 may have a first side 136a, a second side 136b, a third side 136c, and a fourth side 136d. The third side 136c may be opposite the first side 136a. The fourth side 136d may be opposite the second side 136b. In some embodiments, the spring bumper 130 may be attached to the first side 136a. Additionally, or alternatively, one or more spring bumpers 130 may be attached to the second side 136b, the third side 136c, and/or the fourth side 136d. In some embodiments, the spring bumper 130 may be a single component that is attached to and/or encircles multiple sides of the moveable platform 110, such that bumper elements are included at those sides. In a non-limiting example, the spring bumper 130 may comprise a component formed of a sheet of metal, and the component may encircle the first side 136a, the second side 136b, the third side 136c, and/or the fourth side 136d.

In some embodiments, the spring bumper 130 may be formed of a sheet of metal. The spring bumper 130 may include one or more bumper elements 138 configured to engage with the protrusion(s) 132, e.g., when a lateral movement stroke of the moveable platform 110 satisfies a stroke threshold. Furthermore, the bumper element(s) 138 may be deflected by the protrusion(s) 132 and into the recess(es) 134, e.g., when the lateral movement stroke of the moveable platform 110 exceeds the stroke threshold. For example, FIGS. 1D and 1F provide examples of a bumper element 138 in a deflected state 138'. The bumper element(s) 138 may be X-shaped in some embodiments, e.g., as indicated in FIGS. 1B and 1G. However, the bumper element(s) 138 may be any other suitable shape in various embodiments. As a non-limiting example, the bumper element(s) 138 may be tear-drop-shaped in some embodiments. A spring bumper 130 may include any number of bumper element(s) 138 at each of one or more sides of the moveable platform 110. For example, the spring bumper 130 may include a first bumper element 138a and a second bumper element 138b at the first side 136a of the moveable platform 110. The first bumper element 138a and the second bumper element 138b may be formed from a single component (e.g., by etching, laser ablating, punching, and/or otherwise removing material from a same sheet of metal). According to various examples, the spring bumper 130 may be attached to the moveable platform 110 via an adhesive 140, e.g., as indicated in FIG. 1G.

According to some embodiments, the spring bumper 130 and the shield can 108 may be made of one or more materials that provide a reduction in triboelectric static charge buildup that occurs due to contact between the spring bumper 130 and the shield can 108. For example, the spring bumper 130 and the shield can 108 may each be formed of metal, which may allow for a reduction in triboelectric static charge buildup as compared to, e.g., a metal component that comes into contact with a plastic component. In some instances, triboelectric static charge buildup may negatively impact performance of the camera 100 and/or user experience with the camera 100. For example, triboelectric static charge buildup may lead to jump step issues after certain events (e.g., drop events).

Figure 2A:
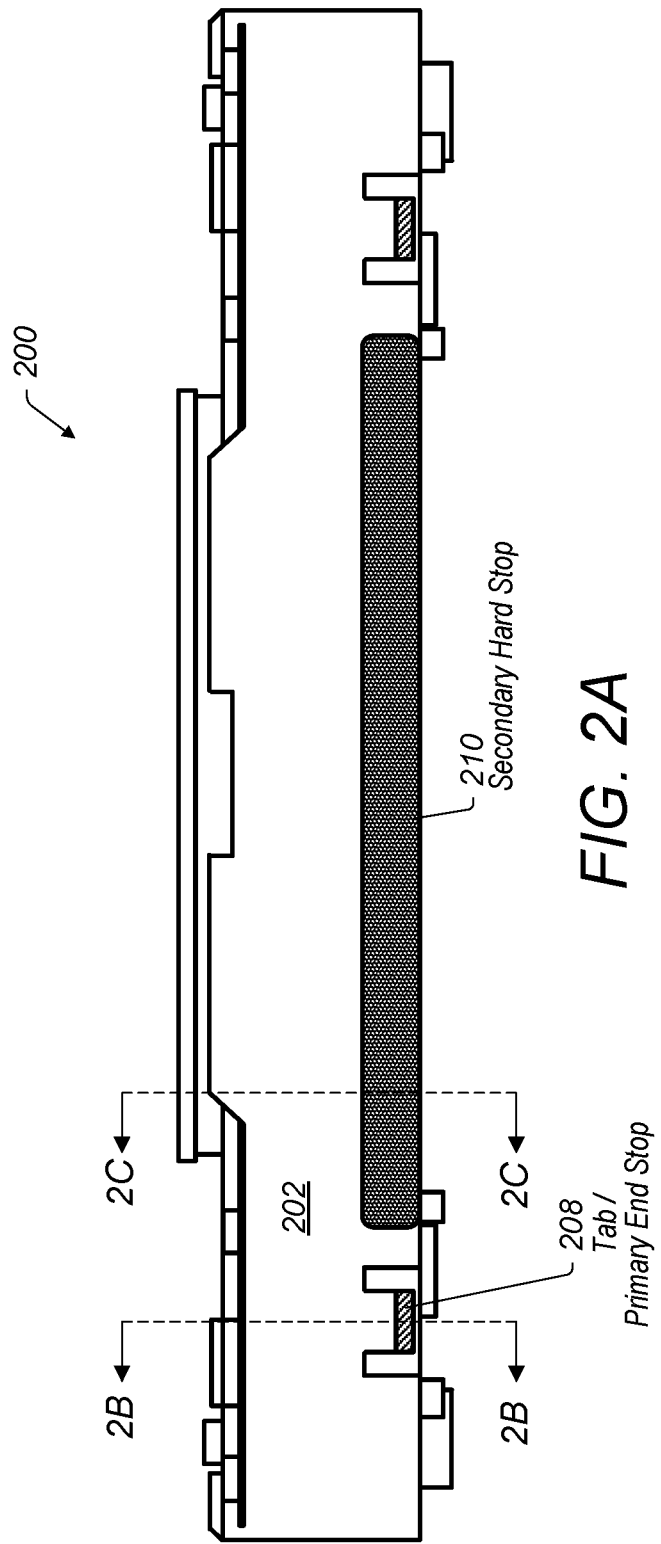
FIGS. 2A-2C illustrate views of another example bumper arrangement for cushioning lateral movement of a moveable platform of a camera, in accordance with some embodiments.
Figure 2B:
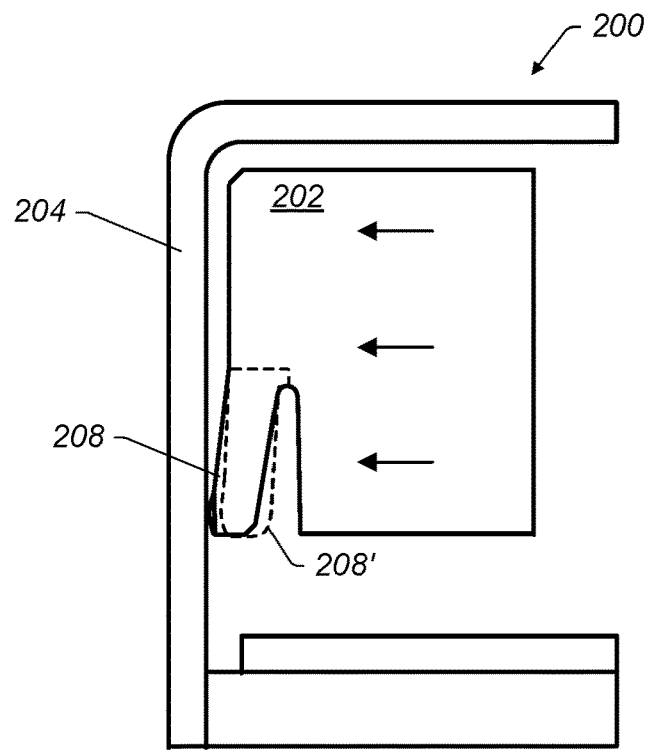
Figure 2C:
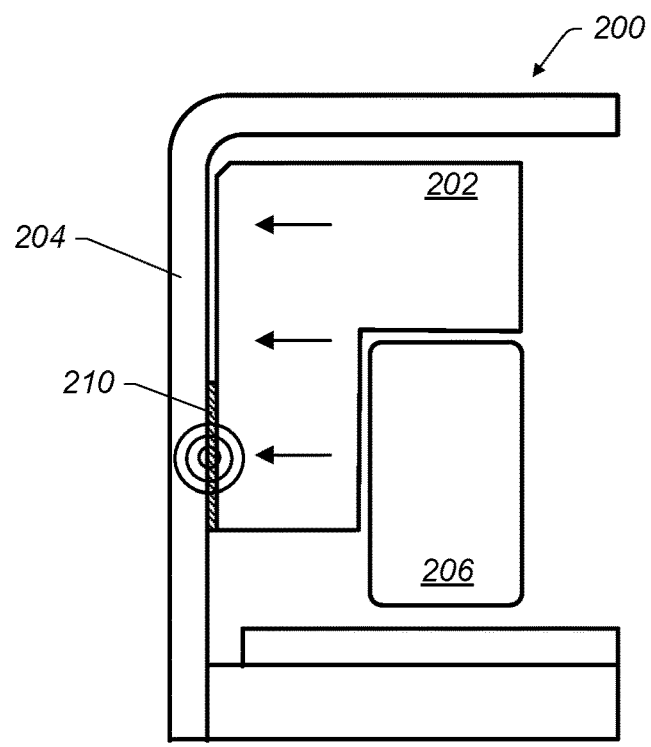

FIGS. 2A-2C illustrate views of another example bumper arrangement 200 for cushioning lateral movement of a moveable platform of a camera. FIG. 2A shows a side view of the bumper arrangement 200. FIG. 2B shows a cross-sectional view of the bumper arrangement 200. FIG. 2C shows another cross-sectional view of the bumper arrangement 200.

In some embodiments, the camera may be similar in some respects to the camera 100 described above with reference to FIGS. 1A-1G. For example, the camera may include a lens group (e.g., lens 102 in FIG. 1A), a lens carrier (e.g., lens carrier 122 in FIG. 1A), an image sensor (e.g., image sensor 104 in FIG. 1C), an actuator (e.g., actuator 106 in FIG. 1A), a moveable platform 202, and/or a stationary structure 204 (see FIGS. 2B-2C). The lens group may include one or more lens elements that define an optical axis. The image sensor may capture light that passes through the lens group. The actuator may be configured to move the lens group relative to the image sensor. Furthermore, the camera may include a suspension spring structure, such as the suspension spring structure described above with reference to FIGS. 1A-1G.

According to some embodiments, the stationary structure 204 may include a shield can that covers at least a portion of the internal component(s) of the camera. Furthermore, the moveable platform 202 may include a magnet holder that holds one or more magnets 206 of the actuator. In other embodiments, the stationary structure 204 may include one or more components other than the shield can, and the moveable platform 202 may include one or more components other than the magnet holder.

In some embodiments, the moveable platform 202 may be coupled to the lens group. For instance, the moveable platform 202 may be coupled to the lens group such that the moveable platform 202 moves together (e.g., in lockstep) with the lens group, e.g., when the actuator moves the lens group relative to the image sensor. In some examples, the moveable platform 202 may be coupled to the lens group such that the moveable platform 202 and the lens group are moveable together in one or more directions orthogonal to the optical axis. In various embodiments, the moveable platform 202 may have multiple sides, e.g., four sides like the moveable platform 110 shown in FIG. 1B. The moveable platform 202 may encircle the lens carrier and/or the lens group in some embodiments. The moveable platform 202 may have fewer or more than four sides in some embodiments.

According to various embodiments, the bumper arrangement 200 may include one or more tabs 208 that protrude from the moveable platform 202, such that the tab(s) 208 extend toward the stationary structure 204, e.g., as indicated in FIG. 2B. The tab(s) 208 may be configured to compress and/or provide compliance to cushion lateral movement of the moveable platform 202 as the moveable platform 202 approaches the stationary structure 204. For example, the tab(s) 208 may be configured to engage with an inner surface of the stationary structure 204 when a lateral movement stroke of the moveable platform 202 reaches a stroke threshold. Furthermore, the tab(s) 208 may be configured to deflect towards the lens group when a lateral movement stroke of the moveable platform 202 exceeds the stroke threshold. For example, FIG. 2B shows a tab 208 in a deflected state 208'. In some examples, the stroke threshold may correspond to a functional range of lateral movement, e.g., a range of lateral movement stroke within which the lens group and/or the moveable platform 202 are shifted to provide optical image stabilization (OIS).

In some embodiments, the tab(s) 208 may serve as primary end stop portion(s) of the moveable platform 202, and the bumper arrangement 200 may include one or more secondary hard stop portions 210 of the moveable platform 202, e.g., as indicated in FIGS. 2A-2C. The moveable platform 202 may be structured such that a tab/primary end stop portion 208 protrudes (e.g., towards the stationary structure 204, away from the lens group, etc.) beyond a plane defined by a secondary hard stop portion 210 that is at the same side of the moveable platform 202. In some instances, the tab(s)/primary end stop portion(s) 208 may make contact with the stationary structure 204 before the secondary hard stop portion(s) make contact with the stationary structure 204. The tab(s)/primary end stop portion(s) 208 may cushion lateral movement of the moveable platform 202 when a lateral movement stroke of the moveable platform 202 exceeds a first stroke threshold. As indicated in FIG. 2C, contact between the secondary hard stop portion(s) 210 and the stationary structure 204 may stop lateral movement of the moveable platform 202. For example, the secondary hard stop portion(s) 210 may stop lateral movement of the moveable platform 202 when the lateral movement stroke of the moveable platform 202 reaches a second stroke threshold. In this example, the second stroke threshold may be greater than the first stroke threshold.

In some embodiments, the tab(s) 208 may be formed from the moveable platform 202. For example, the tab(s) 208 and the rest of the moveable platform 202 may be formed together (e.g., as a single component) via molding. In some embodiments, the tab(s) 208 and the moveable platform 202 may initially be separate components, and the tab(s) 208 may be insert molded with the moveable platform 202 to form a combined, insert molded component.

As indicated in FIG. 2A, one or more sides of the moveable platform 202 may include one or more tabs/primary end stop portions 208 and/or one or more secondary hard stop portions 210. In some non-limiting examples, a secondary hard stop portion 210 may be located between a pair of tabs/primary end stop portions 208. However, a side of the moveable platform 202 may include fewer or more tab(s)/primary end stop portion(s) 208 and/or secondary hard stop portion(s) 210. Furthermore, the tab(s)/primary end stop portion(s) 208 and/or the secondary hard stop portion(s) 210 may be located and/or oriented differently than indicated in FIGS. 2A-2C. As a non-limiting example, a side of the moveable platform 202 may have a first tab/primary end stop portion 208 that extends downward, and a second tab/primary end stop portion 208 that extends upward. A secondary hard stop portion 210 may be located between the first tab/primary end stop portion 208 and the second tab/primary end stop portion 208.

In some cases, the bumper arrangement 200 may reduce triboelectric static charge buildup by reducing an overall contact area between the moveable platform 202 and the stationary structure 204. As a non-limiting example, the contact area may be reduced when the first stroke threshold is reached or exceeded (e.g., such that the tab(s)/primary end stop portion(s) 208 make contact with the stationary structure 204) but the second stroke threshold is not reached (e.g., such that the secondary hard stop portion(s) 210 do not make contact with the stationary structure 204). In some embodiments, a coating (e.g., a conductive coating, an optically clear coating, etc.) (not shown) may be applied to at least a portion of the tab(s)/primary end stop portion(s) 208 and/or to at least a portion of the secondary end stop portion(s) 210. Selection of the material(s) of the coating may be based at least in part on their ability to reduce triboelectric static charge buildup resulting from contact between the coating and the stationary structure 204.

Figure 3A:
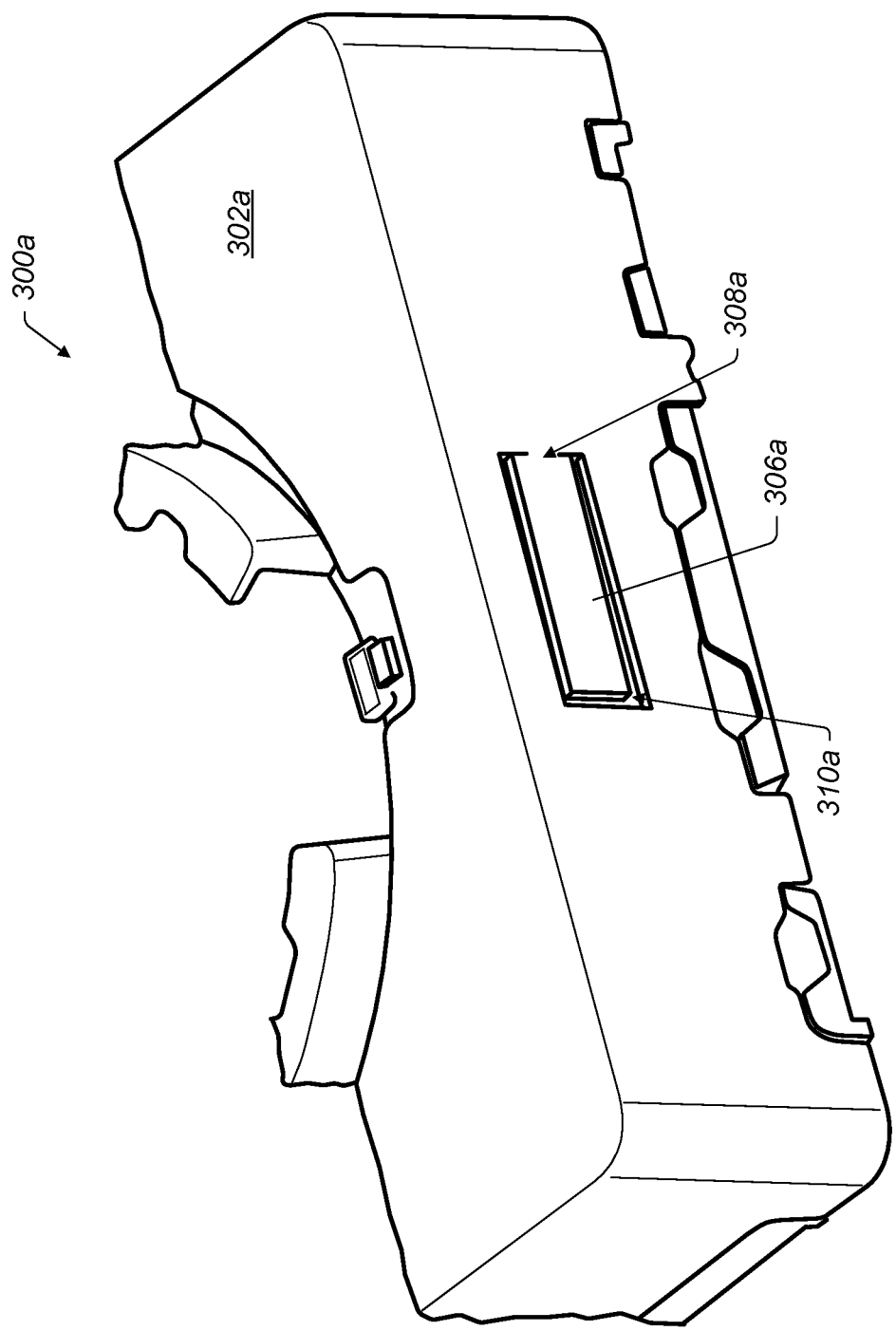

FIGS. 3A-3C illustrate views of yet another example bumper arrangement 300a for cushioning lateral movement of a moveable platform of a camera. FIG. 3A shows a perspective view of the bumper arrangement 300a. FIG. 3B shows a top view of the bumper arrangement 300a. FIG. 3C shows a top view of an example alternative embodiment 300c of the bumper arrangement.

In some embodiments, the camera may be similar in some respects to the camera 100 described above with reference to FIGS. 1A-1G. For example, the camera may include a lens group (e.g., lens 102 in FIG. 1A), a lens carrier (e.g., lens carrier 122 in FIG. 1A), an image sensor (e.g., image sensor 104 in FIG. 1C), an actuator (e.g., actuator 106 in FIG. 1A), a stationary structure 302a, 302c, and/or a moveable platform 304a, 304c (see FIGS. 3B-3C). The lens group may include one or more lens elements that define an optical axis.

The image sensor may capture light that passes through the lens group. The actuator may be configured to move the lens group relative to the image sensor. Furthermore, the camera may include a suspension spring structure, such as the suspension spring structure described above with reference to FIGS. 1A-1G.

According to some embodiments, the stationary structure 302a, 302c may include a shield can that covers at least a portion of the internal component(s) of the camera. Furthermore, the moveable platform 304a, 304c may include a magnet holder that holds one or more magnets (e.g., magnet 124 in FIG. 1A) of the actuator. In other embodiments, the stationary structure 302a, 302c may include one or more components other than the shield can, and the moveable platform 304a, 304c may include one or more components other than the magnet holder.

In some embodiments, the moveable platform 304a, 304c may be coupled to the lens group. For instance, the moveable platform 304a, 304c may be coupled to the lens group such that the moveable platform 304a, 304c moves together (e.g., in lockstep) with the lens group, e.g., when the actuator moves the lens group relative to the image sensor. In some examples, the moveable platform 304a, 304c may be coupled to the lens group such that the moveable platform 304a, 304c and the lens group are moveable together in one or more directions orthogonal to the optical axis. In various embodiments, the moveable platform 304a, 304c may have multiple sides, e.g., four sides like the moveable platform 110 shown in FIG. 1B. The moveable platform 304a, 304c may encircle the lens carrier and/or the lens group in some embodiments. The moveable platform 304a, 304c may have fewer or more than four sides in some embodiments.

According to various embodiments, the bumper arrangement 300a shown in FIGS. 3A-3B may include one or more tabs 306a that protrude from the stationary structure 302a, e.g., such that the tab(s) 306a extend toward the moveable platform 304a. The tab(s) 306a may be configured to compress and/or provide compliance to cushion lateral movement of the moveable platform 304a as the moveable platform 304a approaches the stationary structure 302a. For example, the tab(s) 306a may be configured to engage with an outer surface of the moveable platform 304a when a lateral movement stroke of the moveable platform 304a reaches a stroke threshold. Furthermore, the tab(s) 306a may be configured to deflect away from the lens group when a lateral movement stroke of the moveable platform 304a exceeds the stroke threshold. In some examples, the stroke threshold may correspond to a functional range of lateral movement, e.g., a range of lateral movement stroke within which the lens group and/or the moveable platform 304a are shifted to provide OIS.

In various embodiments, the tab(s) 306a may be formed from the stationary structure 302a. For example, the tab(s) 306a may be defined from the stationary structure 302a via laser ablating, stamping, punching, and/or otherwise removing material from the stationary structure 302a.

One or more sides of the stationary structure 302a may include one or more tabs 306a. FIGS. 3A-3B show a side of the stationary structure 302a having a single tab 306a that located in a central portion of the side. The tab 306a may include a root end 308a (e.g., an end that is connected to the rest of the stationary structure 302a) and a free end 310a (e.g., an end that is distal to the root end 308a). In various embodiments, a side of the stationary structure 302a may include multiple tabs 306a. Furthermore, the tab(s) 306a may be located and/or oriented differently than indicated in FIGS. 3A-3B. As a non-limiting example, one or more sides of the stationary structure 302a may include a first tab and a second tab. The respective free ends 310a of the first tab and the second tab may be oriented in the same direction, or in different directions (e.g., in opposite directions).

In some non-limiting embodiments, a portion of the stationary structure 302a may be laser ablated to a desired thickness to form a body of a tab 306a, and a C-shaped (or U-shaped) pattern may be fully ablated (e.g., completely through the thickness of the stationary structure 302a) to form outer edges of the tab 306a, which may define a root end 308a and a free end 310a of the tab 306a. According to some embodiments, the body of tab 306a may have a tapered thickness. For example, the root end 308a of the tab 306a may be thicker than the free end 310a of the tab 306a. A gradient of thicknesses may exist between the root end 308a and the free end 310a. For example, the tab 306a may gradually decrease in thickness from the root end 308a to the free end 310a, which may be achieved by applying laser ablation in a tapered manner in some embodiments.

According to various embodiments, the bumper arrangement 300c shown in FIG. 3C may include one or more tabs 306c defined by the stationary structure 302c. In some embodiments, the tab(s) 306c may not protrude toward the moveable platform 304c, but may extend parallel to a plane defined by an outer surface of the moveable platform 304c, e.g., as indicated in FIG. 3C. The bumper arrangement 300c may include one or more protrusions 308c attached to (and/or defined by) the moveable platform 304c. The tab(s) 306c may be configured to engage corresponding protrusion(s) 308c and compress and/or provide compliance to cushion lateral movement of the moveable platform 304c as the moveable platform 304c approaches the stationary structure 302c. For example, a tab 306c may be configured to engage with a corresponding protrusion 308c when a lateral movement stroke of the moveable platform 304c reaches a stroke threshold. Furthermore, the tab 306c may be configured to deflect away from the lens group when a lateral movement stroke of the moveable platform 304c exceeds the stroke threshold. In some examples, the stroke threshold may correspond to a functional range of lateral movement, e.g., a range of lateral movement stroke within which the lens group and/or the moveable platform 304c are shifted to provide OIS.

In various embodiments, the tab(s) 306c may be formed from the stationary structure 302c. For example, the tab(s) 306c may be defined from the stationary structure 302c via laser ablating, stamping, punching, and/or otherwise removing material from the stationary structure 302c.

One or more sides of the stationary structure 302c may include one or more tabs 306c, and one or more corresponding protrusions 308c may be attached to one or more sides of the moveable platform 304c. FIG. 3C shows a side of the stationary structure 302c having a single tab 306c that located in a central portion of the side. In various embodiments, a side of the stationary structure 302c may include multiple tabs 306c. Furthermore, the tab(s) 306c may be located and/or oriented differently than indicated in FIG. 3C. As a non-limiting example, one or more sides of the stationary structure 302c may include a first tab and a second tab. The respective free ends of the first tab and the second tab may be oriented in the same direction, or in different directions (e.g., in opposite directions).

In some non-limiting embodiments, a portion of the stationary structure 302c may be laser ablated to a desired thickness to form a body of a tab 306c, and a C-shaped (or U-shaped) pattern may be fully ablated (e.g., completely through the thickness of the stationary structure 302c) to form outer edges of the tab 306c, which may define a root end and a free end of the tab 306c. According to some embodiments, the body of tab 306a may have a tapered thickness. For example, the root end of the tab may be thicker than the free end of the tab 306c. A gradient of thicknesses may exist between the root end and the free end, e.g., as discussed above with reference to FIGS. 3A-3B. In some embodiments, the thickness(es) of the body of the tab 306c may designed to account for the lateral movement stroke of the moveable platform 304c. For example, laser ablation may be used to reduce the thickness of the stationary structure 302c to form the body of the tab 306c such that a maximum lateral movement stroke of the moveable platform 304c is accounted for within the original thickness of the stationary structure 302c. In this manner, a maximum deflection of the tab 306c may not protrude beyond an outer surface of the stationary structure 302c, e.g., as indicated by the deflected state 306c' of the tab 306c shown in FIG. 3C.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 4:
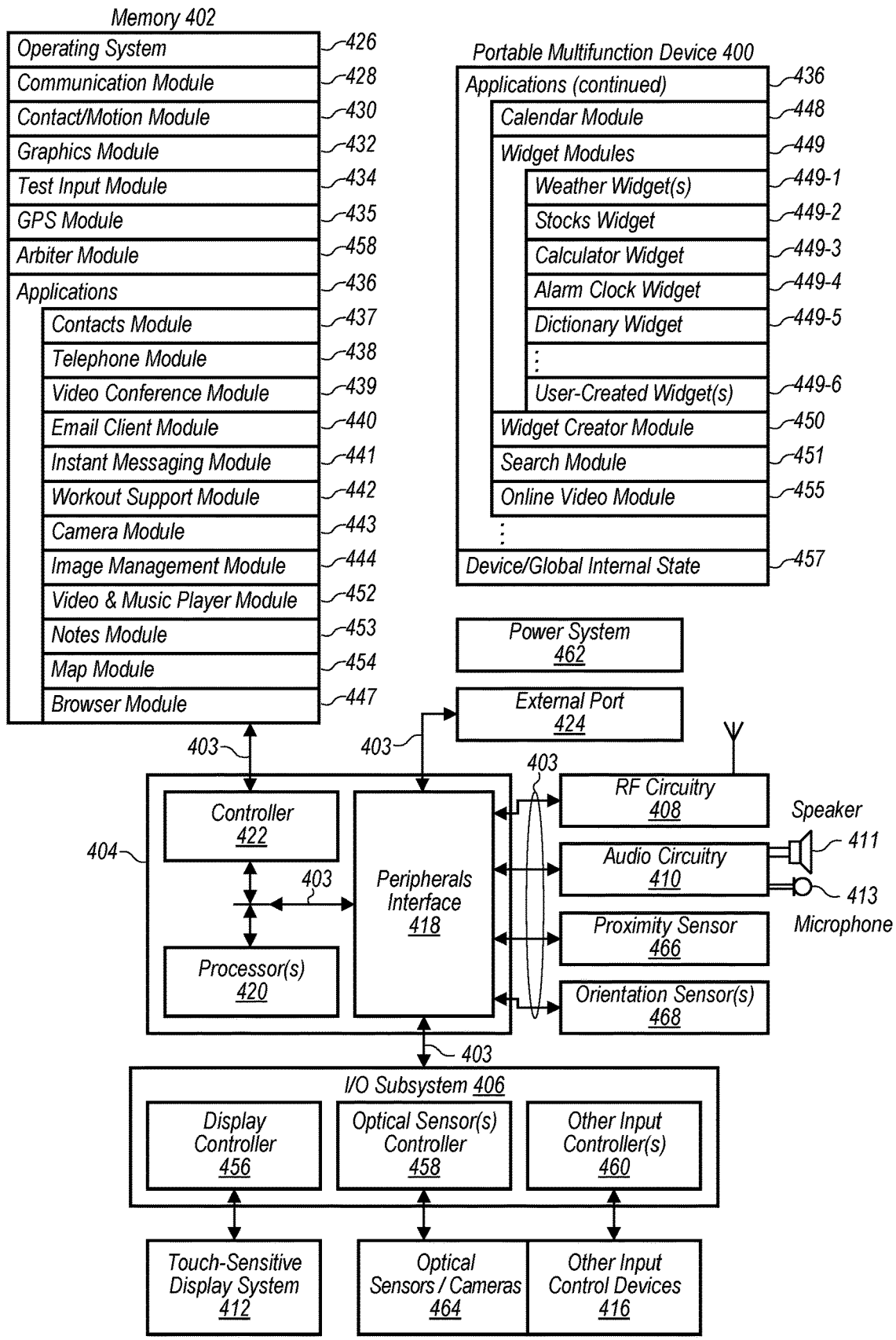
FIG. 4 illustrates a block diagram of a portable multifunction device that may include a camera having one or more bumper arrangements, in accordance with some embodiments.

Attention is now directed toward embodiments of portable devices with cameras. FIG. 4 illustrates a block diagram of an example portable multifunction device 400 that may include a camera having one or more bumper arrangements (e.g., the bumper arrangements described above with reference to FIGS. 1A-3C), in accordance with some embodiments. Cameras 464 are sometimes called "optical sensors" for convenience, and may also be known as or called an optical sensor system. Device 400 may include memory 402 (which may include one or more computer readable storage mediums), memory controller 422, one or more processing units (CPUs) 420, peripherals interface 418, RF circuitry 408, audio circuitry 410, speaker 411, touch-sensitive display system 412, microphone 413, input/output (I/O) subsystem 406, other input or control devices 416, and external port 424. Device 400 may include multiple optical sensors 464. These components may communicate over one or more communication buses or signal lines 403.

It should be appreciated that device 400 is only one example of a portable multifunction device, and that device 400 may have more or fewer components than shown, may combine two or more components, or may have a different configuration or arrangement of the components. The various components shown in FIG. 4 may be implemented in hardware, software, or a combination of hardware and software, including one or more signal processing and/or application specific integrated circuits.

Memory 402 may include high-speed random access memory and may also include non-volatile memory, such as one or more magnetic disk storage devices, flash memory devices, or other non-volatile solid-state memory devices. Access to memory 402 by other components of device 400, such as CPU 420 and the peripherals interface 418, may be controlled by memory controller 422.

Peripherals interface 418 can be used to couple input and output peripherals of the device to CPU 420 and memory 402. The one or more processors 420 run or execute various software programs and/or sets of instructions stored in memory 402 to perform various functions for device 400 and to process data.

In some embodiments, peripherals interface 418, CPU 420, and memory controller 422 may be implemented on a single chip, such as chip 404. In some other embodiments, they may be implemented on separate chips.

RF (radio frequency) circuitry 408 receives and sends RF signals, also called electromagnetic signals. RF circuitry 408 converts electrical signals to/from electromagnetic signals and communicates with communications networks and other communications devices via the electromagnetic signals. RF circuitry 408 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 410, speaker 411, and microphone 413 provide an audio interface between a user and device 400. Audio circuitry 410 receives audio data from peripherals interface 418, converts the audio data to an electrical signal, and transmits the electrical signal to speaker 411. Speaker 411 converts the electrical signal to human-audible sound waves. Audio circuitry 410 also receives electrical signals converted by microphone 413 from sound waves. Audio circuitry 410 converts the electrical signal to audio data and transmits the audio data to peripherals interface 418 for processing. Audio data may be retrieved from and/or transmitted to memory 402 and/or RF circuitry 408 by peripherals interface 418. In some embodiments, audio circuitry 410 also includes a headset jack (e.g., 512, FIG. 5). The headset jack provides an interface between audio circuitry 410 and removable audio input/output peripherals, such as output-only headphones or a headset with both output (e.g., a headphone for one or both ears) and input (e.g., a microphone).

I/O subsystem 406 couples input/output peripherals on device 400, such as touch screen 412 and other input control devices 416, to peripherals interface 418. I/O subsystem 406 may include display controller 456 and one or more input controllers 460 for other input or control devices. The one or more input controllers 460 receive/send electrical signals from/to other input or control devices 416. The other input control devices 416 may include physical buttons (e.g., push buttons, rocker buttons, etc.), dials, slider switches, joysticks, click wheels, and so forth. In some alternate embodiments, input controller(s) 460 may be coupled to any (or none) of the following: a keyboard, infrared port, USB port, and a pointer device such as a mouse. The one or more buttons (e.g., 508, FIG. 5) may include an up/down button for volume control of speaker 411 and/or microphone 413. The one or more buttons may include a push button (e.g., 506, FIG. 5).

Touch-sensitive display 412 provides an input interface and an output interface between the device and a user. Display controller 456 receives and/or sends electrical signals from/to touch screen 412. Touch screen 412 displays visual output to the user. The visual output may include graphics, text, icons, video, and any combination thereof (collectively termed "graphics"). In some embodiments, some or all of the visual output may correspond to user-interface objects.

Touch screen 412 has a touch-sensitive surface, sensor or set of sensors that accepts input from the user based on haptic and/or tactile contact. Touch screen 412 and display controller 456 (along with any associated modules and/or sets of instructions in memory 402) detect contact (and any movement or breaking of the contact) on touch screen 412 and converts the detected contact into interaction with user-interface objects (e.g., one or more soft keys, icons, web pages or images) that are displayed on touch screen 412. In an example embodiment, a point of contact between touch screen 412 and the user corresponds to a finger of the user.

Touch screen 412 may use LCD (liquid crystal display) technology, LPD (light emitting polymer display) technology, or LED (light emitting diode) technology, although other display technologies may be used in other embodiments. Touch screen 412 and display controller 456 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 412. In an example embodiment, projected mutual capacitance sensing technology is used, such as that found in the iPhone®, iPod Touch®, and iPad® from Apple Inc. of Cupertino, Calif.

Touch screen 412 may have a video resolution in excess of 800 dpi. In some embodiments, the touch screen has a video resolution of approximately 860 dpi. The user may make contact with touch screen 412 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 400 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 412 or an extension of the touch-sensitive surface formed by the touch screen.

Device 400 also includes power system 462 for powering the various components. Power system 462 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 400 may also include one or more optical sensors or cameras 464. FIG. 4 shows an optical sensor 464 coupled to optical sensor controller 458 in I/O subsystem 406. Optical sensor 464 may include charge-coupled device (CCD) or complementary metal-oxide semiconductor (CMOS) phototransistors. Optical sensor 464 receives light from the environment, projected through one or more lens, and converts the light to data representing an image. In conjunction with imaging module 443 (also called a camera module), optical sensor 464 may capture still images or video. In some embodiments, an optical sensor 464 is located on the back of device 400, opposite touch screen display 412 on the front of the device, so that the touch screen display 412 may be used as a viewfinder for still and/or video image acquisition. In some embodiments, another optical sensor is located on the front of the device so that the user's image may be obtained for videoconferencing while the user views the other video conference participants on the touch screen display.

Device 400 may also include one or more proximity sensors 466. FIG. 4 shows proximity sensor 466 coupled to peripherals interface 418. Alternately, proximity sensor 466 may be coupled to input controller 460 in I/O subsystem 406. In some embodiments, the proximity sensor 466 turns off and disables touch screen 412 when the multifunction device 400 is placed near the user's ear (e.g., when the user is making a phone call).

Device 400 includes one or more orientation sensors 468. In some embodiments, the one or more orientation sensors 468 include one or more accelerometers (e.g., one or more linear accelerometers and/or one or more rotational accelerometers). In some embodiments, the one or more orientation sensors 468 include one or more gyroscopes. In some embodiments, the one or more orientation sensors 468 include one or more magnetometers. In some embodiments, the one or more orientation sensors 468 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 400. In some embodiments, the one or more orientation sensors 468 include any combination of orientation/rotation sensors. FIG. 4 shows the one or more orientation sensors 468 coupled to peripherals interface 418. Alternately, the one or more orientation sensors 468 may be coupled to an input controller 460 in I/O subsystem 406. In some embodiments, information is displayed on the touch screen display 412 in a portrait view or a landscape view based on an analysis of data received from the one or more orientation sensors 468.

In some embodiments, the software components stored in memory 402 include operating system 426, communication module (or set of instructions) 428, contact/motion module (or set of instructions) 430, graphics module (or set of instructions) 432, text input module (or set of instructions) 434, Global Positioning System (GPS) module (or set of instructions) 435, arbiter module 458 and applications (or sets of instructions) 436. Furthermore, in some embodiments memory 402 stores device/global internal state 457. Device/global internal state 457 includes one or more of: active application state, indicating which applications, if any, are currently active; display state, indicating what applications, views or other information occupy various regions of touch screen display 412; sensor state, including information obtained from the device's various sensors and input control devices 416; and location information concerning the device's location and/or attitude.

Operating system 426 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 428 facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 430 may detect contact with touch screen 412 (in conjunction with display controller 456) and other touch sensitive devices (e.g., a touchpad or physical click wheel). Contact/motion module 430 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 430 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 430 and display controller 456 detect contact on a touchpad.

Contact/motion module 430 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 432 includes various known software components for rendering and displaying graphics on touch screen 412 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 432 stores data representing graphics to be used. Each graphic may be assigned a corresponding code. Graphics module 432 receives, from applications etc., one or more codes specifying graphics to be displayed along with, if necessary, coordinate data and other graphic property data, and then generates screen image data to output to display controller 456.

Text input module 434, which may be a component of graphics module 432, provides soft keyboards for entering text in various applications (e.g., contacts 437, e-mail 440, IM 441, browser 447, and any other application that needs text input).

GPS module 435 determines the location of the device and provides this information for use in various applications (e.g., to telephone 438 for use in location-based dialing, to camera 443 as picture/video metadata, and to applications that provide location-based services such as weather widgets, local yellow page widgets, and map/navigation widgets).

Applications 436 may include the following modules (or sets of instructions), or a subset or superset thereof:

contacts module 437 (sometimes called an address book or contact list);
    telephone module 438;
    video conferencing module 439;
    e-mail client module 440;
    instant messaging (IM) module 441;
    workout support module 442;

camera module 443 for still and/or video images;
image management module 444;
browser module 447;
calendar module 448;
widget modules 449, which may include one or more of: weather widget 449-1, stocks widget 449-2, calculator widget 449-3, alarm clock widget 449-4, dictionary widget 449-5, and other widgets obtained by the user, as well as user-created widgets 449-6;
widget creator module 450 for making user-created widgets 449-6;
search module 451;
video and music player module 452, which may be made up of a video player module and a music player module;
notes module 453;
map module 454; and/or online video module 455.

Examples of other applications 436 that may be stored in memory 402 include other word processing applications, other image editing applications, drawing applications, presentation applications, JAVA-enabled applications, encryption, digital rights management, voice recognition, and voice replication.

In conjunction with touch screen 412, display controller 456, contact module 430, graphics module 432, and text input module 434, contacts module 437 may be used to manage an address book or contact list (e.g., stored in application internal state 457), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 438, video conference 439, e-mail 440, or IM 441; and so forth.

In conjunction with RF circuitry 408, audio circuitry 410, speaker 411, microphone 413, touch screen 412, display controller 456, contact module 430, graphics module 432, and text input module 434, telephone module 438 may be used to enter a sequence of characters corresponding to a telephone number, access one or more telephone numbers in address book 437, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 408, audio circuitry 410, speaker 411, microphone 413, touch screen 412, display controller 456, optical sensor 464, optical sensor controller 458, contact module 430, graphics module 432, text input module 434, contact list 437, and telephone module 438, videoconferencing module 439 includes executable instructions to initiate, conduct, and terminate a video conference between a user and one or more other participants in accordance with user instructions.

In conjunction with RF circuitry 408, touch screen 412, display controller 456, contact module 430, graphics module 432, and text input module 434, e-mail client module 440 includes executable instructions to create, send, receive, and manage e-mail in response to user instructions. In conjunction with image management module 444, e-mail client module 440 makes it very easy to create and send e-mails with still or video images taken with camera module 443.

In conjunction with RF circuitry 408, touch screen 412, display controller 456, contact module 430, graphics module 432, and text input module 434, the instant messaging module 441 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 408, touch screen 412, display controller 456, contact module 430, graphics module 432, text input module 434, GPS module 435, map module 454, and music player module 446, workout support module 442 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 412, display controller 456, optical sensor(s) 464, optical sensor controller 458, contact module 430, graphics module 432, and image management module 444, camera module 443 includes executable instructions to capture still images or video (including a video stream) and store them into memory 402, modify characteristics of a still image or video, or delete a still image or video from memory 402.

In conjunction with touch screen 412, display controller 456, contact module 430, graphics module 432, text input module 434, and camera module 443, image management module 444 includes executable instructions to arrange, modify (e.g., edit), or otherwise manipulate, label, delete, present (e.g., in a digital slide show or album), and store still and/or video images.

In conjunction with RF circuitry 408, touch screen 412, display system controller 456, contact module 430, graphics module 432, and text input module 434, browser module 447 includes executable instructions to browse the Internet in accordance with user instructions, including searching, linking to, receiving, and displaying web pages or portions thereof, as well as attachments and other files linked to web pages.

In conjunction with RF circuitry 408, touch screen 412, display system controller 456, contact module 430, graphics module 432, text input module 434, e-mail client module 440, and browser module 447, calendar module 448 includes executable instructions to create, display, modify, and store calendars and data associated with calendars (e.g., calendar entries, to do lists, etc.) in accordance with user instructions.

In conjunction with RF circuitry 408, touch screen 412, display system controller 456, contact module 430, graphics module 432, text input module 434, and browser module 447, widget modules 449 are mini-applications that may be downloaded and used by a user (e.g., weather widget 449-1, stocks widget 449-2, calculator widget 449-3, alarm clock widget 449-4, and dictionary widget 449-5) or created by the user (e.g., user-created widget 449-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 408, touch screen 412, display system controller 456, contact module 430, graphics module 432, text input module 434, and browser module 447, the widget creator module 450 may be used by a user to create widgets (e.g., turning a user-specified portion of a web page into a widget).

In conjunction with touch screen 412, display system controller 456, contact module 430, graphics module 432, and text input module 434, search module 451 includes executable instructions to search for text, music, sound, image, video, and/or other files in memory 402 that match one or more search criteria (e.g., one or more user-specified search terms) in accordance with user instructions.

In conjunction with touch screen 412, display system controller 456, contact module 430, graphics module 432, audio circuitry 410, speaker 411, RF circuitry 408, and browser module 447, video and music player module 452 includes executable instructions that allow the user to download and play back recorded music and other sound files stored in one or more file formats, such as MP3 or AAC files, and executable instructions to display, present or otherwise play back videos (e.g., on touch screen 412 or on an external, connected display via external port 424). In some embodiments, device 400 may include the functionality of an MP3 player.

In conjunction with touch screen 412, display controller 456, contact module 430, graphics module 432, and text input module 434, notes module 453 includes executable instructions to create and manage notes, to do lists, and the like in accordance with user instructions.

In conjunction with RF circuitry 408, touch screen 412, display system controller 456, contact module 430, graphics module 432, text input module 434, GPS module 435, and browser module 447, map module 454 may be used to receive, display, modify, and store maps and data associated with maps (e.g., driving directions; data on stores and other points of interest at or near a particular location; and other location-based data) in accordance with user instructions.

In conjunction with touch screen 412, display system controller 456, contact module 430, graphics module 432, audio circuitry 410, speaker 411, RF circuitry 408, text input module 434, e-mail client module 440, and browser module 447, online video module 455 includes instructions that allow the user to access, browse, receive (e.g., by streaming and/or download), play back (e.g., on the touch screen or on an external, connected display via external port 424), send an e-mail with a link to a particular online video, and otherwise manage online videos in one or more file formats, such as H.264. In some embodiments, instant messaging module 441, rather than e-mail client module 440, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 402 may store a subset of the modules and data structures identified above. Furthermore, memory 402 may store additional modules and data structures not described above.

In some embodiments, device 400 is a device where operation of a predefined set of functions on the device is performed exclusively through a touch screen and/or a touchpad. By using a touch screen and/or a touchpad as the primary input control device for operation of device 400, the number of physical input control devices (such as push buttons, dials, and the like) on device 400 may be reduced.

The predefined set of functions that may be performed exclusively through a touch screen and/or a touchpad include navigation between user interfaces. In some embodiments, the touchpad, when touched by the user, navigates device 400 to a main, home, or root menu from any user interface that may be displayed on device 400. In such embodiments, the touchpad may be referred to as a "menu button." In some other embodiments, the menu button may be a physical push button or other physical input control device instead of a touchpad.

Figure 5:
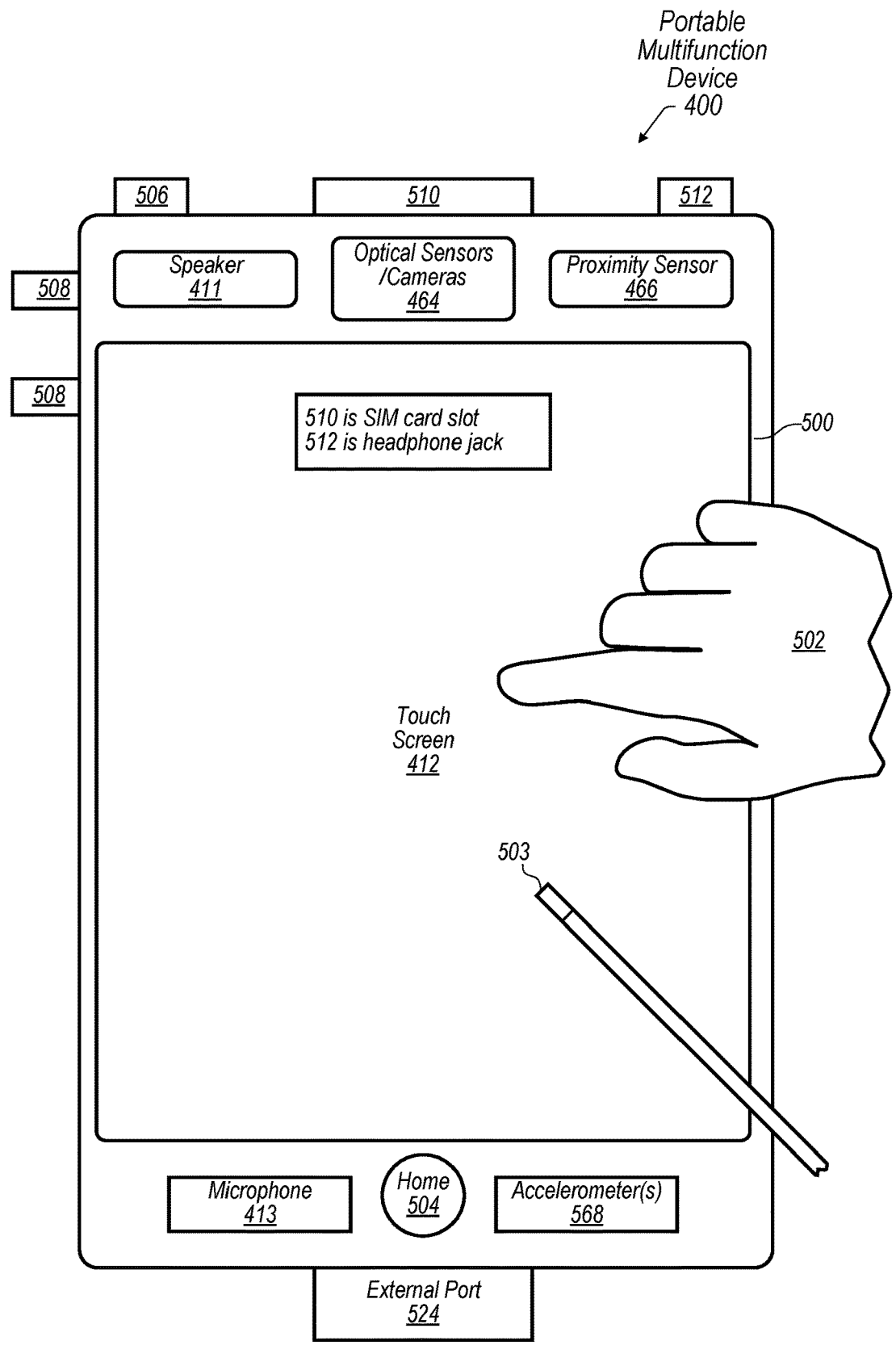
FIG. 5 depicts a portable multifunction device that may include a camera having one or more bumper arrangements, in accordance with some embodiments.

FIG. 5 depicts illustrates an example portable multifunction device 400 that may include a camera having one or more bumper arrangements (e.g., the bumper arrangements described above with reference to FIGS. 1A-3C), in accordance with some embodiments. The device 400 may have a touch screen 412. The touch screen 412 may display one or more graphics within user interface (UI) 500. In this embodiment, as well as others described below, a user may select one or more of the graphics by making a gesture on the graphics, for example, with one or more fingers 502 (not drawn to scale in the figure) or one or more styluses 503 (not drawn to scale in the figure).

Device 400 may also include one or more physical buttons, such as "home" or menu button 504. As described previously, menu button 504 may be used to navigate to any application 436 in a set of applications that may be executed on device 400. Alternatively, in some embodiments, the menu button 504 is implemented as a soft key in a GUI displayed on touch screen 412.

In one embodiment, device 400 includes touch screen 412, menu button 504, push button 506 for powering the device on/off and locking the device, volume adjustment button(s) 508, Subscriber Identity Module (SIM) card slot 510, head set jack 512, and docking/charging external port 524. Push button 506 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 400 also may accept verbal input for activation or deactivation of some functions through microphone 413.

It should be noted that, although many of the examples herein are given with reference to optical sensor(s)/camera(s) 464 (on the front of a device), one or more rear-facing cameras or optical sensors that are pointed opposite from the display may be used instead of, or in addition to, an optical sensor(s)/camera(s) 464 on the front of a device.

Example Computer System

Figure 6:
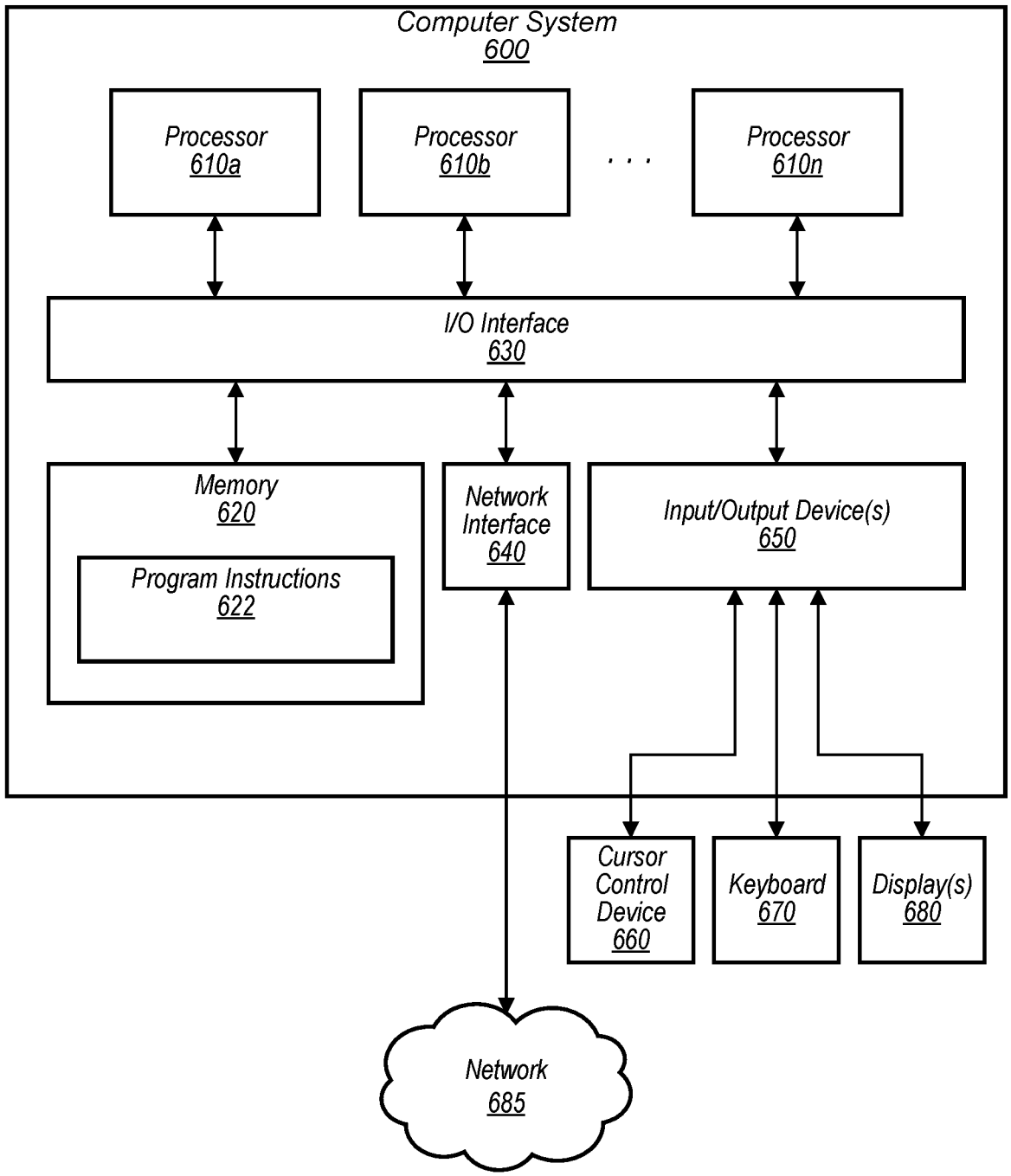
FIG. 6 illustrates an example computer system that may include a camera having one or more bumper arrangements, in accordance with some embodiments.

FIG. 6 illustrates an example computer system 600 that may include a camera having one or more bumper arrangements (e.g., the bumper arrangements described above with reference to FIGS. 1A-3C), according to some embodiments. The computer system 600 may be configured to execute any or all of the embodiments described above. In different embodiments, computer system 600 may be any of various types of devices, including, but not limited to, a personal computer system, desktop computer, laptop, note-book, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 600, which may interact with various other devices. Note that any component, action, or functionality described above with respect to FIGS. 1A-5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store camera control program instructions 622 and/or camera control data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 may be configured to implement a lens control application 624 incorporating any of the functionality described above. Additionally, existing camera control data 632 of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 622, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments (example clauses):

Clause 1: A camera, comprising: a lens group comprising one or more lens elements that define an optical axis; an image sensor to capture light that passes through the lens group; an actuator to move the lens group relative to the image sensor; a stationary structure; a moveable platform coupled to the lens group such that the moveable platform and the lens group are moveable together, relative to the stationary structure, in one or more directions orthogonal to the optical axis; and a bumper arrangement to cushion lateral movement of the moveable platform as the moveable platform approaches the stationary structure.

Clause 2: The camera of Clause 1, wherein: the moveable platform comprises a magnet holder; and the actuator comprises one or more magnets attached to the magnet holder.

Clause 3: The camera of Clause 2, wherein the stationary structure comprises a shield can that radially surrounds, at least in part, the magnet holder.

Clause 4: The camera of any of Clauses 1-3, wherein the bumper arrangement comprises: a spring attached to an outer surface of the moveable platform; a protrusion extending from the stationary structure towards the spring, the protrusion to engage the spring when a lateral movement stroke of the moveable platform reaches a stroke threshold; and a recess defined by the moveable platform, the recess formed to receive a deflected portion of the spring that is deflected by the protrusion when the lateral movement stroke of the moveable platform exceeds the stroke threshold.

Clause 5: The camera of any of Clauses 1-4, wherein the bumper arrangement comprises: a tab formed from the moveable platform, wherein the tab extends from the moveable platform towards the stationary structure, and wherein the tab is configured to deflect towards the lens group when a lateral movement stroke of the moveable platform exceeds a stroke threshold.

Clause 6: The camera of Clause 5, wherein: the stroke threshold is a first stroke threshold; the tab comprises a primary end stop portion for cushioning the lateral movement of the moveable platform when the lateral movement stroke of the moveable platform exceeds the first stroke threshold; and the bumper arrangement further comprises: a secondary hard stop portion for stopping lateral movement of the moveable platform when the lateral movement stroke of the moveable platform reaches a second stroke threshold, wherein the second stroke threshold is greater than the first stroke threshold.

Clause 7: The camera of any of Clauses 1-6, wherein the bumper arrangement comprises: a tab formed from the stationary structure, wherein the tab extends from the stationary structure towards the moveable platform, and wherein the tab is configured to engage with the moveable platform when a lateral movement stroke of the moveable platform reaches a stroke threshold.

Clause 8: The camera of Clause 7, wherein the tab is configured to deflect away from the lens group when the lateral movement stroke of the moveable platform exceeds the stroke threshold.

Clause 9: A device, comprising: one or more processors; memory storing program instructions executable by the one or more processors to control operation of a camera; and the camera, comprising: a lens group comprising one or more lens elements that define an optical axis; an image sensor to capture light that passes through the lens group; an actuator to move the lens group relative to the image sensor; a stationary structure; a moveable platform coupled to the lens group such that the moveable platform and the lens group are moveable together, relative to the stationary structure, one or more directions orthogonal to the optical axis; and a bumper arrangement to cushion lateral movement of the moveable platform as the moveable platform approaches the stationary structure.

Clause 10: The device of Clause 9, wherein: the actuator comprises one or more magnets; the moveable platform comprises a magnet holder coupled with the one or more magnets; and the stationary structure comprises a shield can that radially surrounds, at least in part, the magnet holder.

Clause 11: The device of any of Clauses 9 or 10, wherein the bumper arrangement comprises: a spring attached to an outer surface of the moveable platform; a protrusion extending from the stationary structure towards the spring, the protrusion to engage the spring when a lateral movement stroke of the moveable platform reaches a stroke threshold; and a recess defined by the moveable platform, the recess formed to receive a deflected portion of the spring that is deflected by the protrusion when the lateral movement stroke of the moveable platform exceeds the stroke threshold.

Clause 12: The device of any of Clauses 9-11, wherein the bumper arrangement comprises: a tab formed from the moveable platform, wherein the tab extends from the moveable platform towards the stationary structure, and wherein the tab is configured to deflect towards the lens group when a lateral movement stroke of the moveable platform exceeds a stroke threshold.

Clause 13: The device of any of Clauses 9-12, wherein the bumper arrangement comprises: a tab formed from the stationary structure, wherein the tab extends from the stationary structure towards the moveable platform, and wherein the tab is configured to deflect away from the lens group when a lateral movement stroke of the moveable platform exceeds a stroke threshold.

Clause 14: The device of any of Clauses 9-13, wherein the one or more processors are further to: cause the actuator to move the lens group, along the optical axis, relative to the moveable platform and the image sensor to provide autofocus (AF) movement of an image captured via the image sensor; and cause the actuator to move the lens group and the moveable platform, in the one or more directions orthogonal to the optical axis, relative to the image sensor to provide optical image stabilization (OIS) movement of the image.

Clause 15: An optics system, comprising: a stationary structure; a moveable platform coupled to a lens group of a camera such that the moveable platform and the lens group are moveable together, relative to the stationary structure, in one or more directions orthogonal to an optical axis, wherein the lens group comprises one or more lenses that define the optical axis, and wherein an actuator of the camera is to move the lens group relative to an image sensor of the camera; and a bumper arrangement to cushion lateral movement of the moveable platform as the moveable platform approaches the stationary structure.

Clause 16: The optics system of Clause 15, wherein: the moveable platform comprises a magnet holder to couple with one or more magnets of the actuator; and the stationary structure comprises a shield can that radially surrounds, at least in part, the magnet holder.

Clause 17: The optics system of any of Clauses 15 or 16, wherein the bumper arrangement comprises: a spring attached to an outer surface of the moveable platform; a protrusion extending from the stationary structure towards the spring, the protrusion to engage the spring when a lateral movement stroke of the moveable platform reaches a stroke threshold; and a recess defined by the moveable platform, the recess formed to receive a deflected portion of the spring that is deflected by the protrusion when the lateral movement stroke of the moveable platform exceeds the stroke threshold.

Clause 18: The optics system of any of Clauses 15-17, wherein the bumper arrangement comprises: a tab formed from the moveable platform, wherein the tab extends from the moveable platform towards the stationary structure, and wherein the tab is configured to deflect towards the lens group when a lateral movement stroke of the moveable platform exceeds a stroke threshold.

Clause 19: The optics system of any of Clauses 15-18, wherein the bumper arrangement comprises: a tab formed from the stationary structure, wherein the tab extends from the stationary structure towards the moveable platform, and wherein the tab is configured to engage with the moveable platform when a lateral movement stroke of the moveable platform reaches a stroke threshold.

Clause 20: The optics system of Clause 19, wherein the tab is configured to deflect away from the lens group when the lateral movement stroke of the moveable platform exceeds the stroke threshold.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group comprising one or more lens elements that define an optical axis;
   an image sensor configured to capture light that passes through the lens group;
   an actuator configured to move the lens group relative to the image sensor;
   a stationary structure;
   a moveable platform coupled to the lens group such that the moveable platform and the lens group are moveable together, relative to the stationary structure, in one or more directions orthogonal to the optical axis; and
   a bumper arrangement configured to cushion lateral movement of the moveable platform as the moveable platform approaches the stationary structure, wherein the bumper arrangement comprises:
      a tab formed from the moveable platform or from the stationary platform, wherein the tab is configured to deflect when a lateral movement stroke of the moveable platform exceeds a stroke threshold.

2. The camera of claim 1, wherein:
   the moveable platform comprises a magnet holder.

3. The camera of claim 2, wherein the actuator comprises one or more magnets attached to the magnet holder.

4. The camera of claim 2, wherein the stationary structure comprises a shield can that radially surrounds, at least in part, the magnet holder.

5. The camera of claim 1, wherein the bumper arrangement comprises:
   the tab formed from the moveable platform, wherein the tab extends from the moveable platform towards the stationary structure, and wherein the tab is configured to deflect towards the lens group when a lateral movement stroke of the moveable platform exceeds the stroke threshold.

6. The camera of claim 5, wherein:
   the stroke threshold is a first stroke threshold;
   the tab comprises a primary end stop portion for cushioning the lateral movement of the moveable platform when the lateral movement stroke of the moveable platform exceeds the first stroke threshold; and
   the bumper arrangement further comprises:
      a secondary hard stop portion for stopping lateral movement of the moveable platform when the lateral movement stroke of the moveable platform reaches a second stroke threshold, wherein the second stroke threshold is greater than the first stroke threshold.

7. The camera of claim 1, wherein the bumper arrangement comprises:
   the tab formed from the stationary structure, wherein the tab extends from the stationary structure towards the moveable platform, and wherein the tab is configured to engage with the moveable platform when a lateral movement stroke of the moveable platform reaches the stroke threshold.

8. The camera of claim 7, wherein the tab is configured to deflect away from the lens group when the lateral movement stroke of the moveable platform exceeds the stroke threshold.

9. A device, comprising:
one or more processors;
memory storing program instructions executable by the one or more processors to control operation of a camera; and
the camera, comprising:
a lens group comprising one or more lens elements that define an optical axis;
an image sensor configured to capture light that passes through the lens group;
an actuator configured to move the lens group relative to the image sensor;
a stationary structure;
a moveable platform coupled to the lens group such that the moveable platform and the lens group are moveable together, relative to the stationary structure, in one or more directions orthogonal to the optical axis; and
a bumper arrangement configured to cushion lateral movement of the moveable platform as the moveable platform approaches the stationary structure, wherein the bumper arrangement comprises:
a tab formed from the moveable platform or from the stationary platform, wherein the tab is configured to deflect when a lateral movement stroke of the moveable platform exceeds a stroke threshold.

10. The device of claim 9, wherein:
the actuator comprises one or more magnets.

11. The device of claim 10, wherein:
the stationary structure comprises a shield can that radially surrounds, at least in part, the magnet holder.

12. The device of claim 9, wherein the bumper arrangement comprises:
a tab formed from the moveable platform, wherein the tab extends from the moveable platform towards the stationary structure, and wherein the tab is configured to deflect towards the lens group when a lateral movement stroke of the moveable platform exceeds the stroke threshold.

13. The device of claim 9, wherein the bumper arrangement comprises:
a tab formed from the stationary structure, wherein the tab extends from the stationary structure towards the moveable platform, and wherein the tab is configured to deflect away from the lens group when a lateral movement stroke of the moveable platform exceeds the stroke threshold.

14. The device of claim 9, wherein the one or more processors are further to:
cause the actuator to move the lens group, along the optical axis, relative to the moveable platform and the image sensor to provide autofocus (AF) movement of an image captured via the image sensor; and
cause the actuator to move the lens group and the moveable platform, in the one or more directions orthogonal to the optical axis, relative to the image sensor to provide optical image stabilization (OIS) movement of the image.

15. An optics system, comprising:
a stationary structure;
a moveable platform coupled to a lens group of a camera such that the moveable platform and the lens group are moveable together, relative to the stationary structure, in one or more directions orthogonal to an optical axis, wherein the lens group comprises one or more lenses that define the optical axis, and wherein an actuator of the camera is configured to move the lens group relative to an image sensor of the camera; and
a bumper arrangement configured to cushion lateral movement of the moveable platform as the moveable platform approaches the stationary structure, wherein the bumper arrangement comprises:
a tab formed from the moveable platform or from the stationary platform, wherein the tab is configured to deflect when a lateral movement stroke of the moveable platform exceeds a stroke threshold.

16. The optics system of claim 15, wherein:
the moveable platform comprises a magnet holder to couple with one or more magnets of the actuator; and
the stationary structure comprises a shield can that radially surrounds, at least in part, the magnet holder.

17. The optics system of claim 15, wherein the bumper arrangement comprises:
a tab formed from the moveable platform, wherein the tab extends from the moveable platform towards the stationary structure, and wherein the tab is configured to deflect towards the lens group when a lateral movement stroke of the moveable platform exceeds the stroke threshold.

18. The optics system of claim 17, wherein:
the stroke threshold is a first stroke threshold;
the tab comprises a primary end stop portion for cushioning the lateral movement of the moveable platform when the lateral movement stroke of the moveable platform exceeds the first stroke threshold; and
the bumper arrangement further comprises:
a secondary hard stop portion for stopping lateral movement of the moveable platform when the lateral movement stroke of the moveable platform reaches a second stroke threshold, wherein the second stroke threshold is greater than the first stroke threshold.

19. The optics system of claim 15, wherein the bumper arrangement comprises:
a tab formed from the stationary structure, wherein the tab extends from the stationary structure towards the moveable platform, and wherein the tab is configured to engage with the moveable platform when a lateral movement stroke of the moveable platform reaches the stroke threshold.

20. The optics system of claim 19, wherein the tab is configured to deflect away from the lens group when the lateral movement stroke of the moveable platform exceeds the stroke threshold.

* * * * *